United States Patent [19]

Tanabe et al.

[11] Patent Number: 5,177,736
[45] Date of Patent: Jan. 5, 1993

[54] PACKET SWITCH

[75] Inventors: Shiro Tanabe, Hachioji; Akinori Kubo, Kawasaki; Yoshiaki Kihara, Yokohama, all of Japan

[73] Assignees: Hitachi Ltd., Tokyo; Hitachi Software Engineering Co., Ltd., Yokohama, both of Japan

[21] Appl. No.: 649,966

[22] Filed: Feb. 4, 1991

[30] Foreign Application Priority Data

Feb. 7, 1990 [JP] Japan .................. 2-026054

[51] Int. Cl.⁵ .............................................. H04J 3/12
[52] U.S. Cl. .................... 370/60; 370/94.1; 370/15
[58] Field of Search ............... 370/15, 60, 94.1

[56] References Cited

U.S. PATENT DOCUMENTS

| | | | |
|---|---|---|---|
| 4,486,877 | 12/1984 | Turner | 370/15 |
| 4,550,397 | 11/1985 | Turner et al. | 370/60 |
| 4,561,090 | 12/1985 | Turner | 370/60 |
| 4,670,871 | 6/1987 | Vaidya | 370/60 |
| 4,782,478 | 11/1988 | Day, Jr. et al. | 370/60 |

Primary Examiner—Douglas W. Olms
Assistant Examiner—Russell Blum
Attorney, Agent, or Firm—Antonelli, Terry Stout & Kraus

[57] ABSTRACT

A packet switch comprises a switch having a plurality of input lines and a plurality of output lines for sending a packet supplied from each of the input lines to one of the output lines selected in accordance with routing information attached to each packet, a plurality of pairs of input/output lines connected to terminals or other switches, a plurality of line interface provided one for each of the input/output lines and each connected to one of the input lines and one of the output lines of the switch, and a controller connected to one of the input lines and one of the output lines of the switch. Control information is communicated between the controller and the line interfaces or the switch via a control packet through the switch. The switch may be a plurality of multi-stage connected unit switches and input lines and output lines thereof are divided into a plurality of groups. The controller is connected to an input line of one of first stage unit switches and an output line of one of final stage unit switches of one of the switch groups.

13 Claims, 15 Drawing Sheets

FIG.5

| DESTINATION EQUIPMENT | OUTPUT VCI | ROUTING INFORMATION | | |
|---|---|---|---|---|
| 100-1 | 2 | R1 | R2 | R3 |
| 100-2 | 2 | R1 | R2 | R3' |
| ⋮ | ⋮ | ⋮ | ⋮ | ⋮ |
| 100-X | 2 | — | — | — |
| 240-1 | 1 | R1 | R2 | R3 |
| 240-2 | 1 | R1' | R2' | R3' |
| ⋮ | ⋮ | ⋮ | ⋮ | ⋮ |
| 240-P | 1 | — | — | — |
| 250-1 | 1 | R1 | R2" | — |
| 250-2 | 1 | R1' | R2" | — |
| ⋮ | ⋮ | ⋮ | ⋮ | ⋮ |
| 250-P | 1 | — | — | — |
| 260-1 | 1 | R1 | R2 | R3" |
| 260-2 | 1 | R1' | R2' | R3" |
| ⋮ | ⋮ | ⋮ | ⋮ | ⋮ |
| 260-P | 1 | — | — | — |

311-1, 311-2, 311-3 — 311
311A (upper section), 311B (lower section)

FIG.6

| OUTPUT VCI | ROUTING INFORMATION FOR CENTRAL PROCESSOR | | |
|---|---|---|---|
| 0 | r1 | r2 | r3 |

| INPUT VCI | OUTPUT VCI | ROUTING INFORMATION | | | 134 |
|---|---|---|---|---|---|
| 0 | 0 | ROUTE FOR CENTRAL PROCESSOR | | | |
| 1 | 1 | ROUTE FOR SWITCH CONTROLLER | | | |
| 2 | 2 | NOT USED | | | |
| 3 | N1 | R1 | R2 | R3 | |
| ⋮ | ⋮ | | | | |
| y | — | — | — | — | |

| DESTINATION EQUIPMENT | OUTPUT VCI | ROUTING INFORMATION | | |
|---|---|---|---|---|
| 100-1 | 2 | R1 | R2 | R3 |
| 100-2 | 2 | | | |
| ⋮ | ⋮ | | | |
| 100-X | 2 | | | |
| 240-1 | 1 | | | |
| 240-2 | 1 | | | |
| ⋮ | ⋮ | | | |
| 240-P | 1 | | | |
| 250-1 | 1 | | | |
| 250-2 | 1 | | | |
| ⋮ | ⋮ | | | |
| 250-P | 1 | | | |
| 260-1 | 1 | | | |
| 260-2 | 1 | | | |
| ⋮ | ⋮ | | | |
| 260-P | 1 | | | |
| 500-1 | 3 | | | |
| ⋮ | ⋮ | | | |
| 500-(P-1) | 3 | | | |

- 311-1, 311-2, 311-3, 311
- 311A (rows 100-1 to 100-X)
- 311B (rows 240-1 to 260-P)
- 311C (rows 500-1 to 500-(P-1))

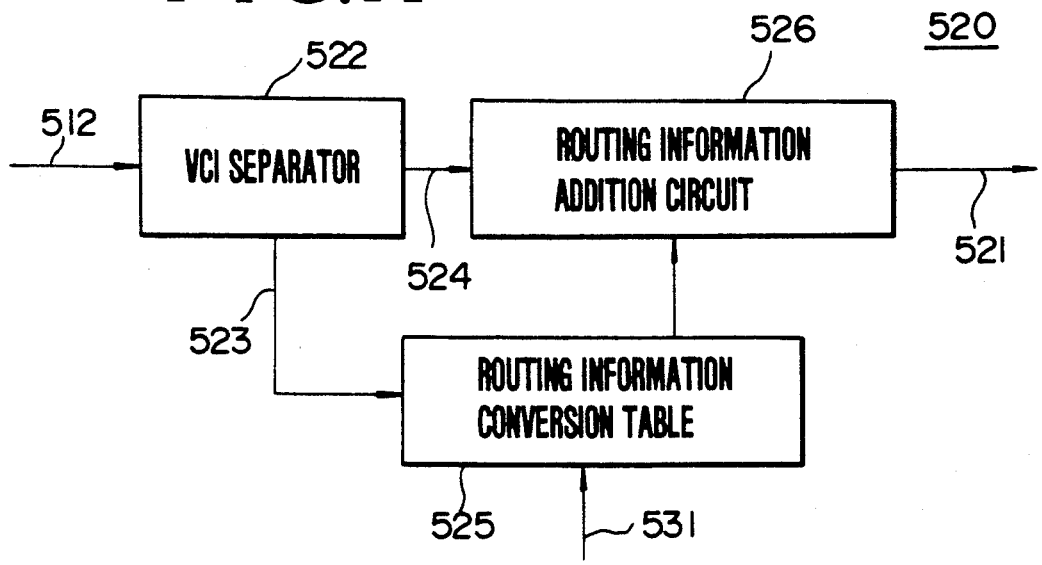

FIG.22

| DESTINATION EQUIPMENT | OUTPUT VCI | ROUTING INFORMATION | | | | | |
|---|---|---|---|---|---|---|---|
| 100-1 | 2 | R1 | R2 | R3 | — | — | — |
| 100-2 | 2 | R1 | R2 | R3' | — | — | — |
| ⋮ | ⋮ | ⋮ | ⋮ | ⋮ | ⋮ | ⋮ | ⋮ |
| 100-X | 2 | — | — | — | — | — | — |
| 240-1 | 1 | R1 | R2 | R3 | R4 | R5 | R6 |
| 240-2 | 1 | R1' | R2' | R3' | R4' | R5' | R6' |
| ⋮ | ⋮ | ⋮ | ⋮ | ⋮ | ⋮ | | |
| 240-P | 1 | — | — | — | — | | |
| 250-1 | 1 | R1 | R2" | — | | | |
| 250-2 | 1 | R1' | R2" | — | | | |
| ⋮ | ⋮ | ⋮ | ⋮ | | | | |
| 250-P | 1 | — | — | | | | |
| 260-1 | 1 | R1 | R2" | | | | |
| 260-2 | 1 | R1' | | | | | |
| ⋮ | ⋮ | ⋮ | | | | | |
| 260-P | 1 | | | | | | |

311-1, 311-2, 311-3, 311

311A, 311B

PACKET SWITCH

BACKGROUND OF THE INVENTION

1. Field of the Invention

The present invention relates to a packet switch, and more particularly to an improved system in the connection between a speech path equipment and a control equipment in the packet switch and the transmission of a control signal.

2. Description of the Related Art

As described in "Digital Switch for Telephone" DIGITAL COMMUNICATION SERIES, published by Sangyo Tosho Co , Ltd., 1986 (p. 117), a conventional digital switch comprises a speech path for accommodating a transmission line and exchanging packets and a controller for controlling various equipments of the speech path such as, a distribution speech path equipment (hereinafter referred to as a switch), a concentrator and a subscriber circuit. The equipments of the speech path and the controller are connected through a speech path bus to allow the transmission and reception of control information between the speech path and the controller.

The digital switch thus constructed has the following problems.

As a connection distance of the speech path increases, noises are included and the reliability of the control signal transmitted and received between the speech path and the controller is lowered. Thus, there is a restriction in the separation and the increase of distance between the equipments of the speech path and the controller. Where the equipments are interconnected by the speech path bus, it is necessary, when a specification is modified such as the expansion of the speech path, to accommodate the transmission path into the added equipment as well as to connect a new speech path bus between the added equipment and the controller.

SUMMARY OF THE INVENTION

It is an object of the present invention to provide a packet switch which facilitates the connection of speech path equipments and a controller and is suitable for permitting an increase in the distance between the speech path equipments and the controller.

It is another object of the present invention to provide a packet switch which facilitates maintenance work due to the expansion of the speech path.

In order to achieve the above objects, the packet switch of the present invention comprises switch means having a plurality of input lines and a plurality of output lines for sending each of a plurality of packets received from the input lines to a selected one of a plurality of output lines in accordance with identification information put on each packet; a plurality of line interface means provided one for each pair of input and output lines connected to a terminal equipment or other switch lines connected to one of the input lines and one of the output lines of the switch means, a central processor connected to one of the input lines and one of the output lines of the switch means, and the transmission of control information between the control processor and the respective interface means or the switch means is effected by a control packet via the input line or the output line of the switch means.

In the present packet switch, the switch means may comprise a plurality of multi-stage connected unit switches having the input lines and the output lines thereof divided into a plurality of groups, and the central processor is connected to one of the input lines of a first stage unit switch and one of the output lines of a final stage unit switch in one of the groups. A switch controller is provided in each of the unit switches to monitor a congestion status of the packets or send one input packet to a plurality of output lines in a multicast mode. The supply of command information and data to the switch controllers and the report of the status information from the respective switch controllers to the central processor are transmitted by the control packet.

On the other hand, each of the line interface means has a header conversion function for a packet on the input/output line and a packet in the switch, and the control information for the header conversion is transmitted by the control packet.

In the packet switch of the present invention, a source equipment which is to send out the control packet sends out the control packet with routing information attached thereto. The control packet passes through the input line of the switch means for the unit switch thereof. The control packet is exchanged in accordance with the routing information, and reaches a destination equipment.

Where the control packet cannot reach the destination equipment in one pass through the switch means because of the connection between the source equipment of the control packet and the destination equipment, the source equipment sets the routing information such that the control packet is sent to a line interface which has a specific positional relationship with the destination equipment, and the line interface which receives the control packet routes the control packet back to the input line of the switch means. The routing-back of the control packet may be effected by a separate control packet routing-back equipment connected to the input/output lines of the switch means instead of by the line interface.

In accordance with the present invention, no separate wiring for sending the control information is needed between the central processor means which is a primary unit of the controller in the packet switch and the line interface means or the switch controller means which is a portion of the speech path and communicates the control information to the central processor means. Accordingly, the increase of the distance between the speech path and the controller is facilitated and the expansion of the switch function or the line interface to increase the number of accommodated lines of the switch is facilitated.

The foregoing and other objects, advantages, manner of operation and novel features of the present invention will be understood from the following detailed description when read in connection with the accompanying drawings.

BRIEF DESCRIPTION OF THE DRAWINGS

FIG. 5 shows a data structure of a routing information table 311 used in the central processor of FIG. 4;

FIG. 6 shows a data structure of a routing information table 270 in a switch controller in the packet switch of FIG. 1;

FIG. 9 shows a data structure of a VCI conversion table 134 in the VCI converter of FIG. 8;

FIG. 11 shows a data structure of a routing information table 311 in a central processor in the packet switch of FIG. 10;

FIG. 14 shows a block diagram of a routing information converter 520 in the packet routing-back equipment of FIG. 13;

FIG. 15 shows a data structure of a routing information conversion table 525 in the routing information converter of FIG. 14;

FIG. 16 shows a data structure of a routing information table in a packet routing-back equipment controller 530 of FIG. 13;

FIG. 22 shows a data structure of a routing information table 311 referred to by a central processor 300 in a fifth embodiment of the present invention in which the packet format of FIG. 21 is applied to the packet switch of FIG. 1;

DESCRIPTION OF THE PREFERRED EMBODIMENTS

Embodiment 1

Figure 1:
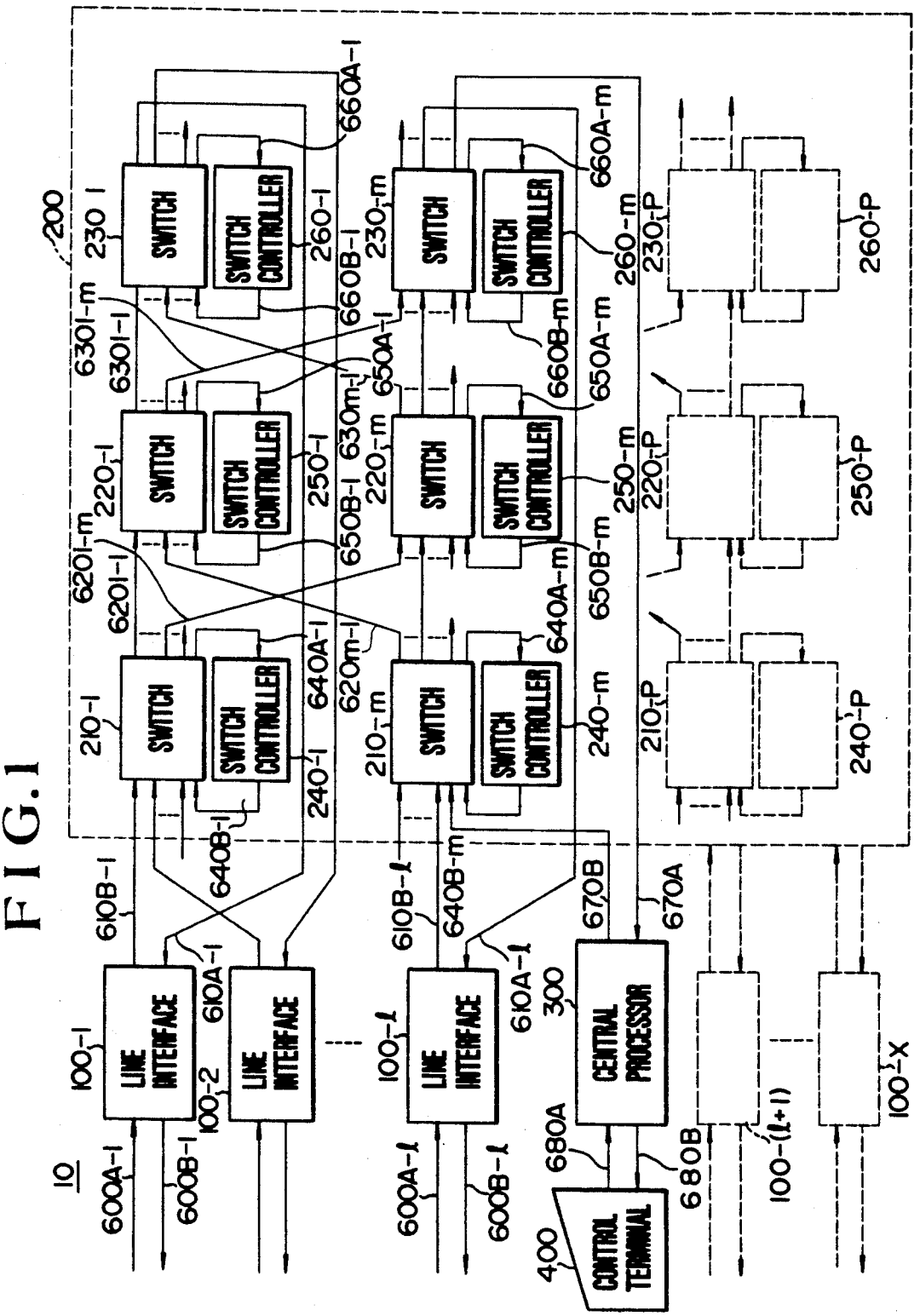
FIG. 1 shows an overall configuration of a first embodiment of a packet switch of the present invention.

Overall Configuration of Packet Switch:

An overall configuration of a packet switch 10 in accordance with the present invention is shown in FIG. 1. In the present embodiment, the packet switch 10 adopts an anynchronous transfer mode (ATM).

Line interfaces 100-1 to 100-1 accommodate input lines 600A (600A-1 to 600A-1) and output lines 600B (600B-1 to 600B-l) connected to subscriber terminal equipments or adjacent packet switches, and output lines 610B (610B-1 to 610B-l) and input lines 610A (610A-1 to 610A-l) connected to a switch unit 200 to be described later. Each line interface 100 sets packet exchange routing information (hereinafter referred to as routing information) in the switch into a packet received from the input line 600A, and delivers it to the switch unit 200 through the output line 610B. It also receives a packet switched by the switch 200 from the input line 610A and sends it to the adjacent packet switch or the subscriber terminal through the output line 600B.

The switch unit 200 comprises a plurality of matrix-arranged unit switches 210 (210-1 to 210-m), 220 (220-1 to 220-m) and 230 (230-1 to 230-m) each having m rows (groups) each having n stages (n=3 in the present embodiment), a plurality of switch controllers 240 (240-1 to 240-m), 250 (250-1 to 250-m) and 260 (260-1 to 260-m) provided one for each unit switch, output lines 6201-1 to 620m-m for supplying outputs of the respective first stage unit switches to all second stage unit switches; output lines 6301-1 to 630m-m for supplying outputs of the respective second stage unit switches to all third stage unit switches, output lines 640A-1 to 660A-m and input lines 640B-1 to 660B-m arranged between pairs of the unit switches and the switch controllers, when each of the unit switches 210-1 to 230-P receives a packet from the line interface 100 or the preceding stage unit switch, it sends the received packet to one of the unit switches in the succeeding stage or the line interface 100 in accordance with routing information included in the received packet.

A central processor 300 sends and receives a packet which includes control information (hereinafter referred to as a control packet) for setting routing information and controlling a flow between the line interfaces 100 (100-1 to 100-x) and the switch controllers 240 (240-1 to 240-p), 250 (250-1 to 250-p) and 260 (260-1 to 260-p) autonomously or by an instruction from a control terminal 400 (to be described later) by using the packet switch function of the switch unit 200. To this end, the central processor 300 accommodates an output line 670-B connected to an input of any one of the unit switches in the first stage (210-m in the present embodiment) and an input line 670-A connected to an output of any one of the unit switches in the final stage (230-m in the present embodiment).

Where the central processor 300 and the switch unit 200 are connected by a set of input/output lines, the central processor 300 cannot directly send the packet to other unit switches in the first stage which are not connected to the output line 670-B nor can it directly receive the packet from other unit switches in the final stage which are not connected to the input line 670-A. In the present embodiment, each line interface 100 has a routing information reassignment function for the control packet and a control packet routing-back function to the switch unit 200 to enable the communication between the central processor 300 and all line interfaces and switch controllers. A plurality of pairs of input/output lines 670A and 670B may be provided in preparation for the trouble such as break.

The terminal 400 commands to the central processor 300 the transmission of the control packet such as routing information setting to the line interfaces 100 and the switch controllers 240, 250 and 260. The terminal 400 and the central processor 300 are connected by input-/output lines 680-A and 680-B.

Figure 2:
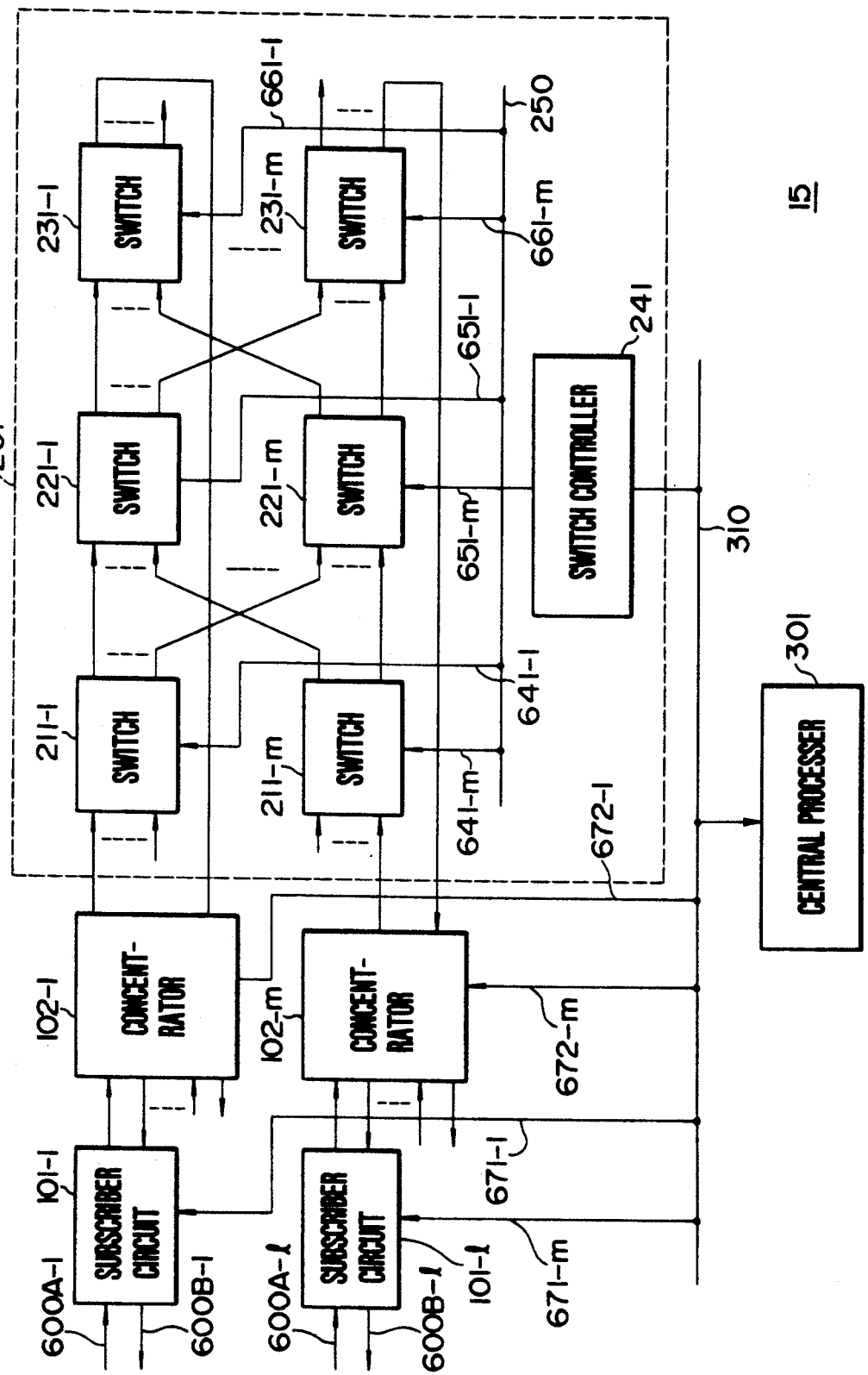
FIG. 2 shows a configuration of a prior art packet switch.

To assist the understanding of the present invention, a communication system for the control information in a prior art digital switch is now briefly explained with reference to FIG. 2.

A prior art digital switch 15 comprises a central processor 301 which corresponds to the central processor 300 of FIG. 1, subscriber lines 101 (101-1 to 101-l) and concentrators 102 (102-1 to 102-m) which correspond to the line interfaces 100, and a distribution speech path equipment 201 which corresponds to the switch unit 200. The distribution speech path equipment 201 comprises, like the switch unit in FIG. 1, m×n-stage (n=3 in the present example) unit switches 211 (211-1 to 211-m), 221 (221-1 to 221-m) and 231 (231-1 to 231-m), and a switch controller 241 which centrally controls the unit switches. The central processor 301 has input/output lines 671 (671-1 to 671-m) and 672 (672-1 to 672-m) between the subscriber lines and the concentrators to enable the communication of the control information with other elements, and it is connected to the respective unit switches by input/output lines 641 (641-1 to 641-m), 651 (651-1 to 651-m) and 661 (661-1 to 661-m) through a switch controller 241.

As seen from the construction of the prior art switch, when any one of the subscriber lines 101, the concentrators 102 and the unit switches 211 to 231 is to be expanded, it is necessary to additionally arrange input-/output lines between the bus 310 or the switch controller 241 and the respective added elements.

On the other hand, in the packet switch of the present invention shown in FIG. 1, when either the switch unit 200 or the line interface 100 is to be expanded, only the modification of the routing information between the central processor 300 and the added elements is required and no special wiring (input/output lines) for communicating the control packet is required.

Figure 3:
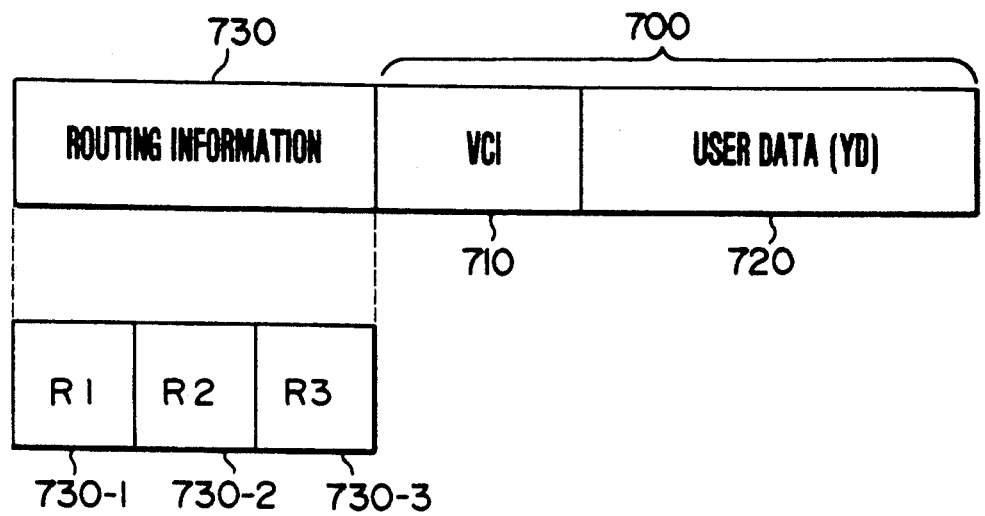
FIG. 3 shows a format of a packet used in the speech communication of control information in the present invention.

Packet Format:

FIG. 3 shows a packet format used in the packet switch 10 of the present invention.

A packet main field 700 comprises a call identifier (VCI) 710 for identifying a call which is a logical communication path, and a user data field (YD) 720 which contains user data.

Routing information 730 is added to the head of the packet main field 700 in order to enable the switch unit 200 to identify an output line to which the packet is to be sent when the packet is transmitted through the switch unit 200. The routing information 730 comprises three fields R1 730-1, R2 730-2 and R3 730-3. The R1 field 730-1 indicates the output lines 620i-1 to 620i-m from the first stage unit switch 210-i to the second stage unit switches 220-1 to 220-m or the output line 640A-i to the switch controller 240-i, the R2 field 730-2 indicates the output lines 630i-1 to 630i-m from the second stage unit switch 220-i to the third stage unit switch 230-1 to 230-m or the output line 650A-i to the switch controller 250i, and the R3 field 730-3 indicates the output lines 610A-1 to 610A-l from the third stage unit switch 230-i to the line interfaces 100-1 to 100-l or the output line 660A-i to the switch controller 260-i.

A control packet also has a similar packet format to that shown in FIG. 3, and the control information is set in the YD field 20.

The following identification codes 0 to 2 are exclusively assigned to the VCI field 710 of the control packet so that each line interface 100 can identify the packets communicated between the switches and the control packet in the switch. VCI=0 is for the central processor 300, VCI=1 is for the switch controllers 240-1 to 260-m, and VCI=2 is for the line interfaces 100-1 to 100-l. The identification codes other than 0 to 2 are used for the packets transmitted between the switches.

Figure 4:
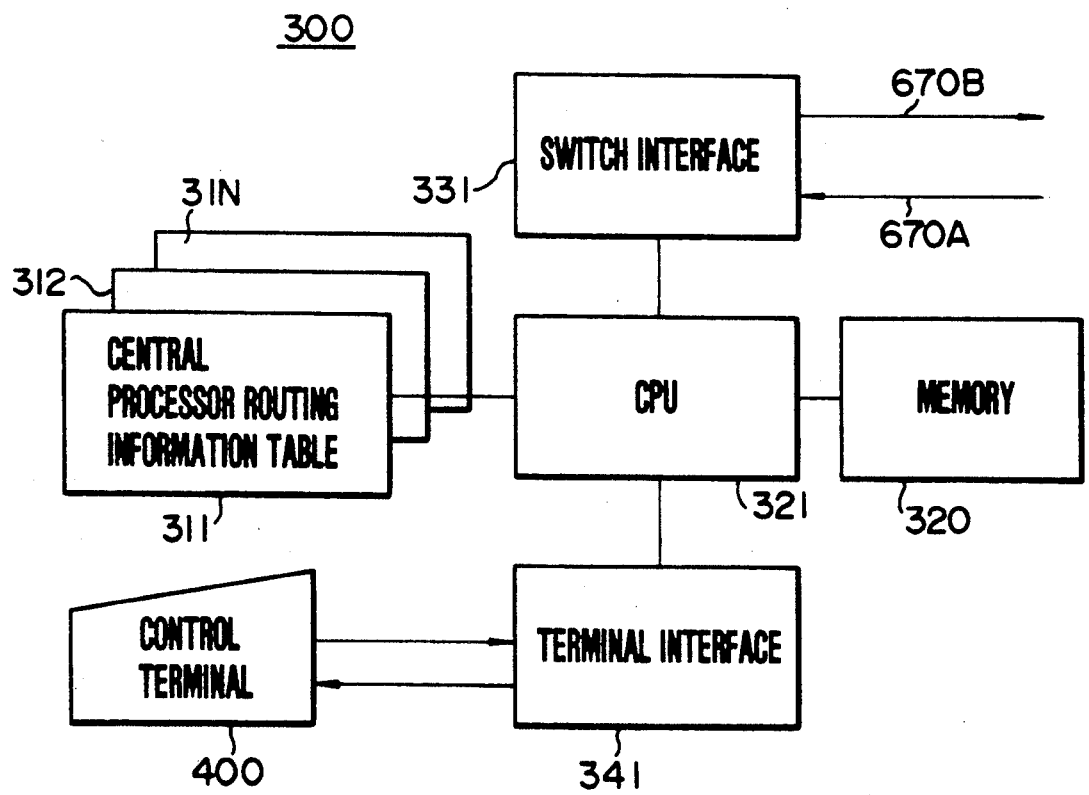
FIG. 4 shows a block diagram of a central processor 300 in the packet switch of FIG. 1.

Central Processor 300:

FIG. 4 shows a block diagram of a configuration of the central processor 300.

The central processor 300 comprises a switch interface 331 connected to input/output lines 670A and 670B, a memory 320 for storing programs and data, a processor (CPU) 321 operable in accordance with the program stored in the memory, a central processor routing information table 311 to be described later, tables 312 to 31N for controlling the call, and an interface 341 to a control terminal 400.

When the CPU receives a call set-up packet from the line interface 100, it looks up the call control tables 312 to 31N such as a VCI control table and sends out a call control packet for a communication destination equipment which is specified by a dialing number. A control packet which includes a VCI and routing information corresponding to the call, which is to be registered in a VCI conversion table 134 to be described later is sent to the line interface which has received the call set-up packet. The CPU 321 sends the control packet in accordance with the instruction from the control terminal to instruct the set-up of the information in the central processor routing information table 311 and the set-up of the information in the routing information tables of the line interfaces and the switch controller, and when it receives a control packet of a completion message from the line interface or the switch controller, it reports the completion to the control terminal 400. It also autonomously sends a control packet relating to the flow control and receives a control packet of the completion message.

As shown in FIG. 5, the central processor routing information table 311 comprises a destination equipment column 311-1, an output VCI column 311-2 and a routing information column 311-3, and it stores an output VCI (1 or 2) to be applied to the fields 710 and 730 of the packet and the routing information for each destination equipment. The routing information table 311 is classified into a record area 311A for the line interfaces and a record area 311B for the switch controllers. Where it is necessary to route back the control packet by the line interface 100, the central processor routing information table 311 includes the routing information upto the routing-back line interface 100.

When the CPU 321 sends the control packet to any one of the destination equipments (line interfaces or switch controllers), it looks up the central processor routing information table 311 in accordance with the identification number of the destination equipment, reads out the output VCI 311-2 and the routing information 311-3 corresponding to the destination equipment, assembles those into the packet format of FIG. 3 together with the control information to be sent to the destination equipment, and delivers it to the switch input/output equipment 331. When it receives a control packet from the switch input/output equipment 331, the CPU 321 processes it in accordance with the control information contained in the packet.

The switch input/output equipment 331 conducts the input/output processing of the control packet for the CPU 321 and the switch unit 200. The terminal interface 341 conducts the input/output processing (such as parameter check) of the command information communicated between the CPU 321 and the control terminal 400 and the information such as completion message for the command.

Switch Unit 200:

Each of the unit switches 210, 220 and 230 is a self-routing switch configured to output by hardware a received packet to the output line designated by the R1 field 730-1, the R2 field 730-2 or the R3 field 730-3 of the received packet.

The switch controllers 240, 250 and 260 paired with those switches respond to the control information contained in the YD field 720 of the control packet sent from the central processor 300 to collect the information relating to the flow control, and send the control packet including the collected information to the central processor 300.

In order to conduct the above operations, each of the switch controllers 240 to 260 is equipped with the switch routing information table 270, which stores the output VCI 270-1 to the central processor 300 and the routing information 270-2. Those output VCI and routing information are set up in the fields 710 and 720 of the control packet addressed to the central processor. Where the control packet need the routing-back, the routing information up to the routing-back line interface 100 is stored in the column 270-2.

Figure 7:
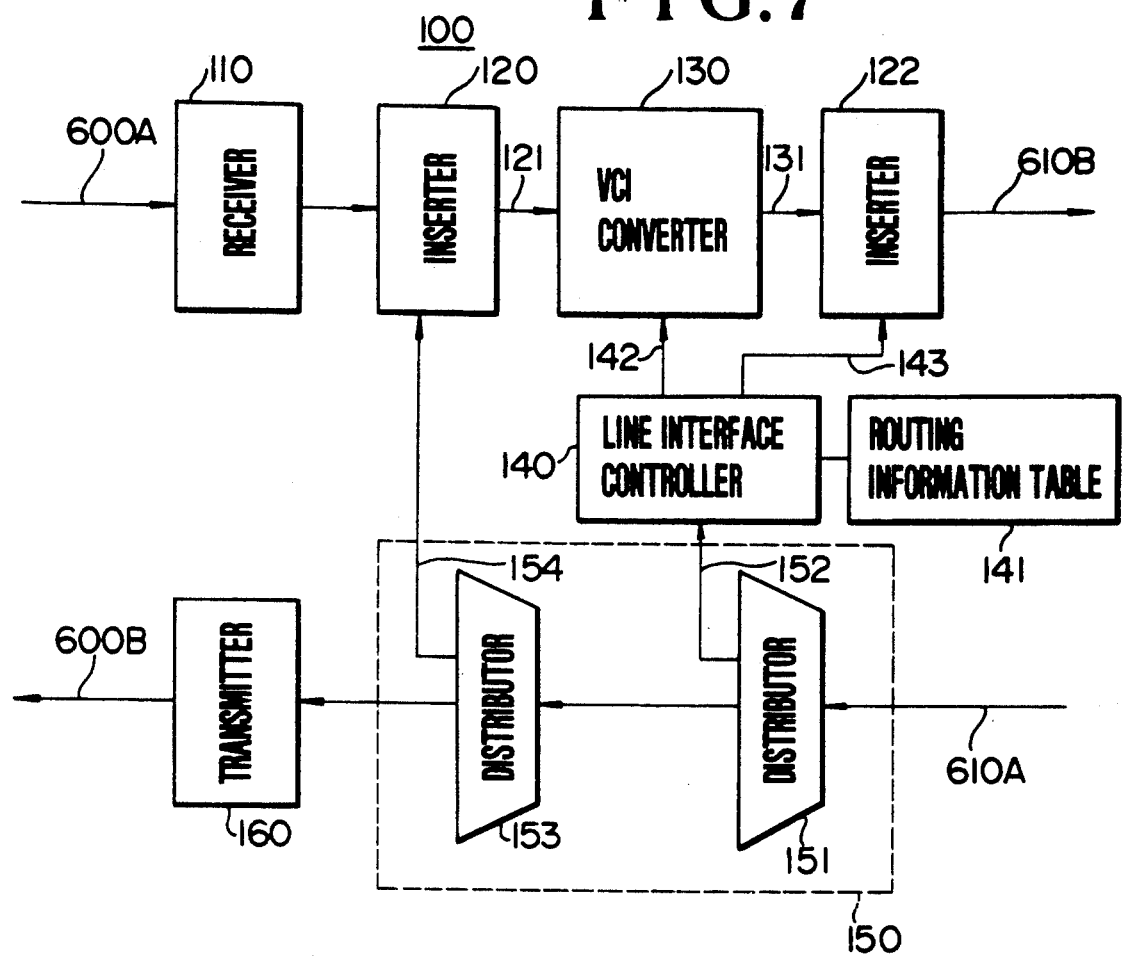
FIG. 7 shows a block diagram of a line interface 100 in the packet switch of FIG. 1.

Line Interface 100:

A configuration of the line interface 100 is shown in FIG. 7.

A receiver 110 accommodates an input line 600A from an adjacent switch and delivers a received packet to an inserter 120, which effects collision avoidance control for the input packets from the receiver 110 and a distributor 153, and delivers the respective packets to a VCI converter 130. An inserter 122 effects collision avoidance control for the input packets from the VCI converter 130 and the line interface controller 140, and delivers the respective input packets to the output line 610B of the switch unit.

Figure 8:
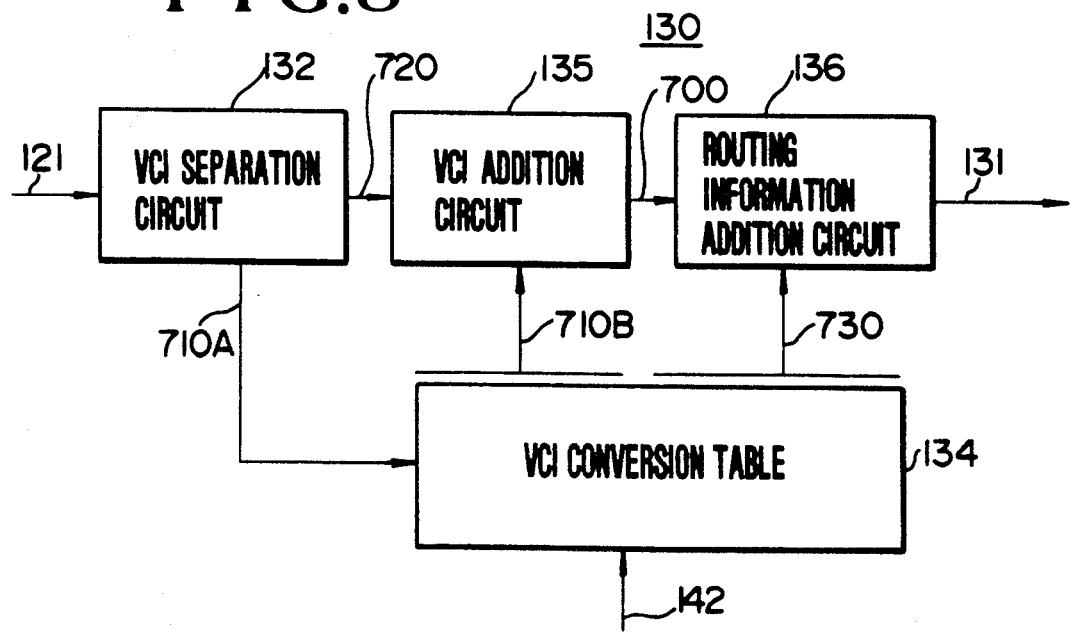
FIG. 8 shows a block diagram of a VCI converter 130 in the line interface of FIG. 7.

A configuration of the VCI converter 130 is shown in FIG. 8. A VCI separator 132 supplies a VCI field (input VCI) 710 included in an input packet from the inserter 120, to a VCI conversion table 134 through a signal line 710A, and delivers a YD field 720 to a VCI addition circuit 135 through a signal line 720.

As shown in FIG. 9, the VCI conversion table 134 stores the output VCI 710B' and the routing information 730' for each input VCI 710A' when the input VCI is applied through an input line 710A, it searches the corresponding output VCI 710B' and routing information 730', and delivers the output VCI to the VCI addition circuit 135 through a signal line 710B and delivers the routing information to the routing information addition circuit 136 through a signal line 730.

The VCI addition circuit 135 adds the output VCI 110B' received from the VCI conversion table 134, to the content 720 of the YD field supplied from the VCI separator 132 to prepare a VCI-converted packet main field. The packet main field is delivered to the routing information addition circuit 136 through a signal line 700.

The routing information addition circuit 136 adds the routing information 730 received from the VCI conversion table 134, to the packet main field received from the VCI addition circuit 135, and delivers it to the inserter 122 through the signal line 131, as stated above, the values 0 to 2 of the input VCI are allocated to the control packets in the switch and other values are allocated to the packets between the switches.

When the input VCI 710A' is "0", the VCI conversion table 134 outputs the same value as the input VCI as the output VCI 710B', and the routing information addressed to the central processor 300 as the routing information 730'. When the input VCI 710A' is "1", it outputs the same value as the input VCI as the output VCI 710B' and the routing information addressed to the switch controller 240-i paired with the first stage unit switch 210-i connected to the own line interface 100i is the routing information 730'. When the input VCI 710A' is "2", this means that the information is for the line interface, and the routing information is not used. When a call control packet of the packets between the switches supplied from the input line 600 is supplied, the VCI conversion table outputs the output VCI addressed to the central controller and the routing information.

Turning back to FIG. 7, the line interface controller 140 sets up the information in the VCI conversion table 141 in accordance with the control information in the control packet received from the central processor 300. It also automonously sends the control packet to the control processor 300. To this end, the line interface controller 140 contains the output VCI to the central processor 300 and the routing information in the line interface routing information table 141, as does the routing information table 270 of the switch controller shown in FIG. 6.

Numeral 150 denotes a distributor which includes distribution circuits 151 and 153. It determines a destination of the packet in accordance with the value of the VCI 710 included in the packet received from the switch unit through the input line 610A. Only when VCI 710 is "2", the distribution circuit 151 distributes the packet to the signal line 152 and delivers it to the line interface controller 140. When the VCI 710 is "0" or "1", the distribution circuit 153 distributes the received packet to the signal line 154 and delivers it to the inserter 120. The packets having other VCI's are delivered to a transmitter 160.

The transmitter 160 accommodates the output line 600B to the adjacent switch and sends the packet received from the distributor 150 to the adjacent switch.

Control Terminal 400:

The control terminal 400 commands to the central processor 300 to send the control packet for setting up the information into the central processor routing information table 311 and the information into the line interface routing information table 141 and the switch routing information table 270.

Operations:

The communication of the control packet in the packet switch 10 includes the packet transmission/reception between the central processor 300 and the switch controllers 240, 250 and 260, and the packet transmission/reception between the central processor 300 and the line interface 100. Of those, the packet can be communicated without the routing-back at the line interface 100 by the system configuration of FIG. 1 in the following cases (a) to (c).

(a) The communication from the central processor 300 to the switch controllers 240-m, 250-i (i=1−m) or 260-i (i=1−m) to which the line 670B is connected.

(b) The communication from the switch controllers 240-i (i=1−m), 250-i (i=1−m) or 260-m (which accommodate the line 670A) to the central processor 300.

(c) The bilateral communication between the central processor 300 and the line interfaces 100-i (i=1−m).

On the other hand, the routing-back of the packet at the line interface is required in the following cases (d) and (e).

(d) The communication from the central processor 300 to the first stage controllers 240-i (i=1−(m−1)) which is not connected to the line 670B. In this case, the central processor 300 sends the control packet to the line interface 100-j accommodated in the first stage unit switch 210-i of the destination switch controller 240-i, and routes back the information to the switch unit 200 after the line interface 100-j has set up the routing information 730 addressed to the switch controller 240-i in the packet.

(e) The communication from the final stage switch controllers 260-i (i=1−(m−1)) not connected to the line 670A to the central processor 300. In this case, the switch controller 260-i sends the control packet to one of the line interface 100 which is accommodated in the unit switch 320-i to which the switch controller 260-i is connected, and routes back the route information 730 to the switch unit 200 after the line interface 100 has set up the routing information 730 addressed to the central processor 300 into the received packet.

Specific operations will now be described in detail.

First, the transmission of the control packet which does not require the routing-back at the line interface is explained.

It corresponds to a case where the control packet is sent from the central processor 300 to the line interface controller 140 in the line interface 100-1. The central processor 300 sets up the output VCI (=2) addressed to the line interface and the routing information to the line interface, retrieved from the line information table 311 into the packet, and sends the packet to the output line 670B.

The control packet is switched from the first stage unit switch 210-m to the third stage unit switch 230-1 through one of the second stage unit switches 220-1 to 220-m, and it is sent to the output line 610A-1 and delivered to the line interface 100-1. In the line interface 100-1, the distribution circuit 151 recognizes the control packet addressed to its own line interface based on the value of the VCI 710 of the received packet, distributes the packet to the signal line 152 and delivers it to the line interface controller 140.

The transmission of the control packet which requires the routing-back at the line interface is now explained.

(a) The transmission from the central processor 300 to the switch controller not connected to the output time 670B, for example, 240-1.

The central processor 300 retrieves the record corresponding to the destination switch controller 240-1 from the routing information table 311, sets up the output VCI 311-2 (=1) designated by the record and the routing information 311-3 to the line interface 100-1 accommodated in the unit switch 210-1 paired with the destination switch controller 240-1, into the control packet, and sends it to the output line 670B. The control packet is switched from the first stage unit switch 210-m to the third stage unit switch 230-1 through one of the second stage unit switches 220-i designated by the routing information, and it is sent to the output line 610A-1 and delivered to the line interface 100-1.

In the line interface 100-1, the distribution circuit 153 recognizes the control packet addressed to the switch controller based on the value of the input VCI 710 of the received packet and distributes it to the signal line 154. The packet is delivered to the VCI converter 130 through the inserter 120.

The VCI converter 130 looks up the VCI conversion table 134 based on the input VCI 710 included in the received package, sets up the output VCI 710 of the same value as the input VCI and the routing information 730 (R1=line 640A-1) to the destination switch controller 240-1 into the packet, and routes back it to the output line 610B-1.

When the first stage unit switch 210-1 receives the packet, it switches the received packet to the line 40A-1 based on the routing information 730 included in the received packet. In this manner, the control packet is supplied to the destination switch controller 240-1.

(b) The transmission from the switch controller not connected to the input line 670A, for example, 260-1 to the central processor 300.

The switch controller 260-1 sets up the VCI (=0) addressed to the central processor retrieved from the switch routing information table 270 and the routing information to the line interface 100-1 connected to one of the output lines of the unit switch 230-1 paired with the switch controller 260-1 into the packet, and sends the packet to the output line 660B-1. The packet is sent to the output line 610A-1 by the unit switch 230-1 and delivered to the line interface 100-1.

In the line interface 100-1, the distributor 153 recognizes that the received packet is the control packet addressed to the central processor 300 based on the input VCI of the received packet, and distributes the packet to the signal line 154. Accordingly, the packet is supplied to the VCI converter 130 through the inserter 120.

The VCI converter 130 looks up the VCI conversion table 134 based on the input VCI of the received packet to retrieve the output VCI of the same value as the input VCI and the routing information to the central processor, sets them up into the fields 710 and 720 of the received packet and routes back the packet to the output line 610B-1. The packet is switched from the unit switch 210-1 to the final stage unit switch 230-m through one of the second stage unit switch 220-i in accordance with the routing information, and delivered to the central processor 300 through the line 670A.

Operation for Expansion:

The operation for the expansion of the line interface 100 or the switch unit 200 in the packet switch 10 is now explained.

When the line interface 100 is to be expanded, for example, when a new line interface 100-(l+1) or 100-x is to be added as shown by broken lines in FIG. 1, the added line interface 100 is connected to a non-used input/output line 610A-k or 610B-k of the switch unit 200. Then, the terminal 400 commands the addition of the equipment number the output VCI and the routing information for the added equipment to the central processor routing information table 311, to the central processor 320.

When the central processor 300 completes the commanded operation, that is, when it is ready for sending the control packet to the added equipment, the terminal 400 commands to the central processor 320 to send the control packet t add the control packet routing-back output VCI and the routing information to the VCI conversion table 134 in the added line interface 100, and the output VCI to the central processor and the routing information to the line interface routing information table 141 in the line interface 100.

On the other hand, when the switch 200 is to be added. for example, when unit switches 210-P to 230-P and the switch controllers 240-P to 260-P are to be added as shown by broken lines in FIG. 1, the added unit switches and the existing unit switches are connected by new output lines 6201-P to 620P-1 and 6301-P to 630P-2. Then, the terminal 400 commands to the central processor 320 to add the output VCI to the added equipments (switch controllers) and the routing information to the central processor routing information table 311. The central processor 300 responds to the command and when it is ready to send the control packet to the added equipment, the terminal 400 commands to the central processor 321 to send the control packet for adding the output VCI to the central processor 300 and the routing information to the switch routing information table 270 in the added switch controller.

Embodiment 2

Figure 10:
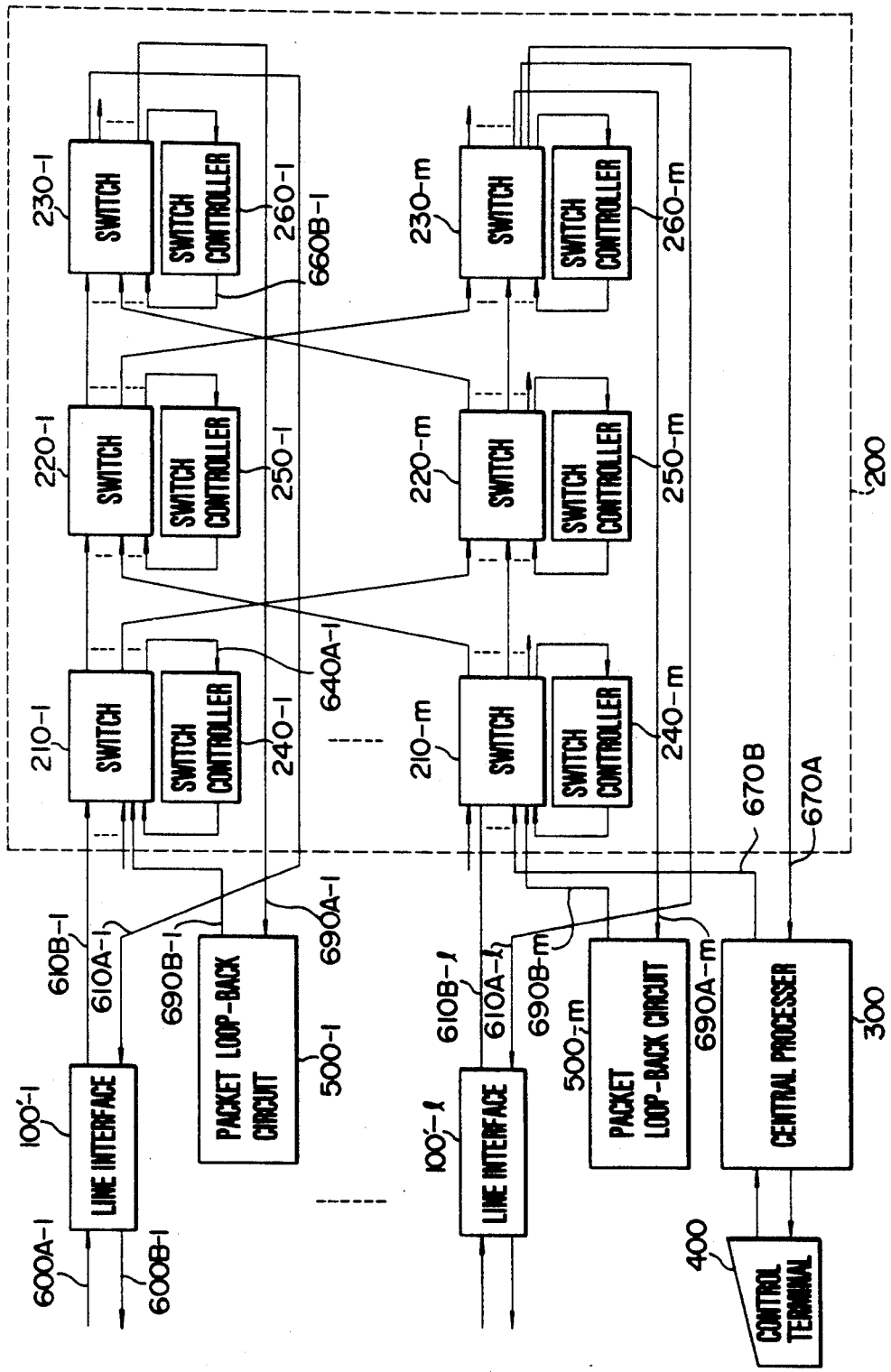
FIG. 10 shows a configuration of a second embodiment of the packet switch of the present invention.

FIG. 10 shows an overall configuration of another embodiment of the packet switch in accordance with the control information communication system by the control packet of the present invention. The packet switch also uses the ATM as the switching system.

Overall Configuration of Packet Switch:

The present invention is identical to the Embodiment 1 except that line interfaces 100' (100'-1 to 100'-l) are not equipped with the set-up function of the routing information to the control packet and the packet routing-back function to the switch unit 200.

The switch unit 200 is identical to that of the Embodiment 1 except that the third stage unit switches 230-1 to 230-m deliver the control packets from the input lines 690-i (i=1−m) to the packet routing-back units 500-i (i=1−m), and the first stage unit switches 210-i (i=1−m) receive the packet from the output lines 690B-i of the packet routing-back units 500-i (i=1−m).

The packet routing-back units 500-i (i=1−m) enable the first stage unit switches which are not directly connected to the central processor 300 through the input/output lines 670A and 670B (other than 210-m in the present embodiment) to transmit and receiver the control packets to and from the central processor 300. Each of them has the set-up function of the routing information to the received control packet and the routing back function of the control packet to the switch unit 200. Each packet routing-back unit 500-i is connected to the first stage and final stage unit switches 210-i and 230-i of the switch unit by the input line 690A-i and the output line 690B-i. It sets up the routing information into the control packet received from the input line 390A-i and routes back the packet to the switch unit 200 through the output line 690B-i.

Packet Format:

In the control packet used in the present embodiment, the output line 690A-i to the packet routing-back unit 500-i may be set up in the R3 field 730-3 in the routing information field 730. A value "3" is set up in the VCI field 710 when the packet is addressed to the packet routing-back unit. The packet format may be the one shown in FIG. 3 as it is for the Embodiment 1.

Central Processor 300:

As shown in FIG. 11, a record 311c including the output VCI having the value "3" for transmitting the control packet to the packet routing-back unit 500 and the routing information is added to the central processor routing information table 311. Where the routing-back at the packet routing-back unit 500 is required in the transmission of the control packet, the routing information up to the packet routing-back unit 500 at which the packet is to be routed back is stored in the routing information 311-3 of the routing information table 311. The others are identical to those of the Embodiment 1.

Switch Unit 200:

Where it is required to route back the control packet sent from the switch controller 260 at the packet routing-back unit 500, the routing information 270-2 up to the packet routing-back unit 500 is stored in the switch routing information table 270. The others are identical to those of the Embodiment 1.

Figure 12:
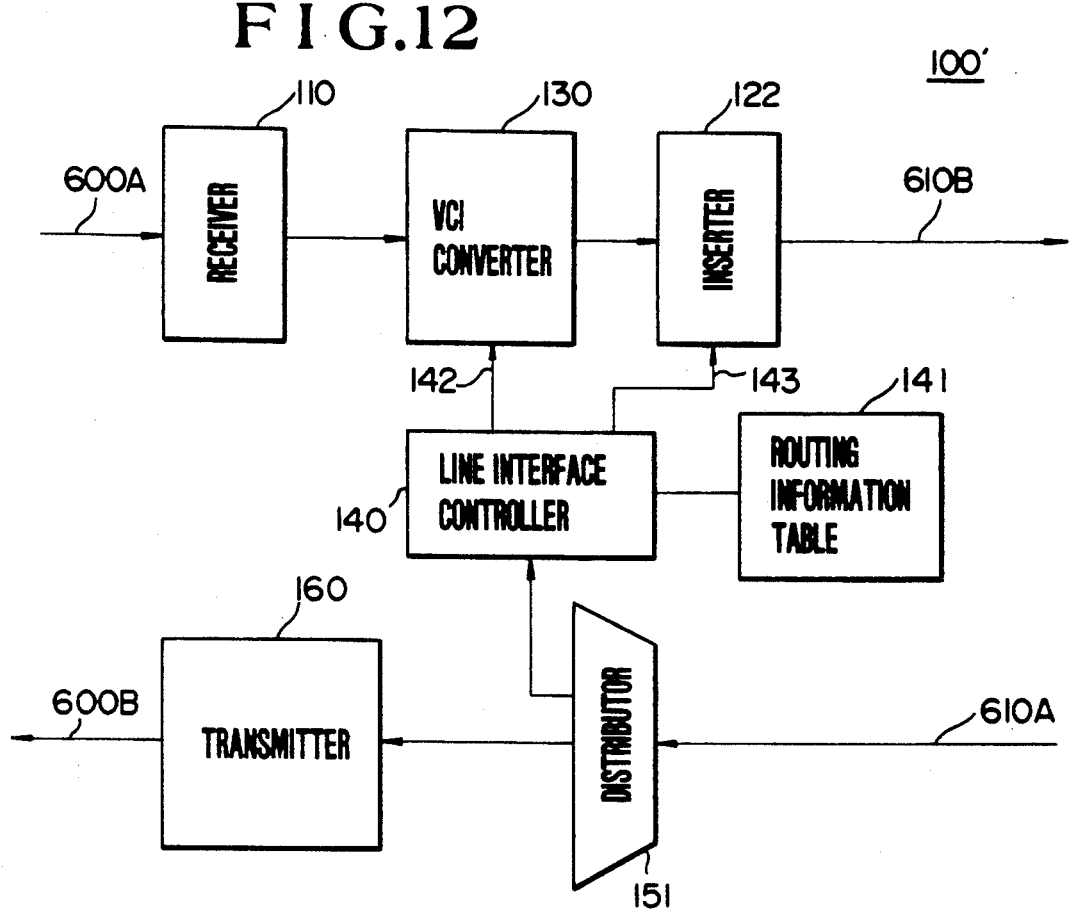
FIG. 12 shows a block diagram of a line interface 100' in the packet switch of FIG. 10.

Line Interface 100':

A configuration of the line interface 100' is shown in FIG. 12.

The receiver 110 accommodates the input line 600A from the adjacent switch and delivers the received packet to the VCI converter 130, which processors the packet received from the receiver 110 in the same manner as that of the Embodiment 1 and delivers the packet to the inserter 122. In the VCI conversion table 134, the routing information having the input VCI of "0" to "2" for which the control packet is not routed back is not used.

The inserter 122 effects the collision avoidance control to the input packets from the VCI converter 130 and the line interface controller 140 and delivers the packets to the output line 310B of the switch unit.

The line interface controller 140 receives only those input packets from the input line 610A which have VCI = "2" and operates in accordance with the control information of the received packet (control packet), as it does in the Embodiment 1. In the present embodiment, the packets having other than VCI = "2" are sent to the output line 600B through the transmitter 160.

Figure 13:
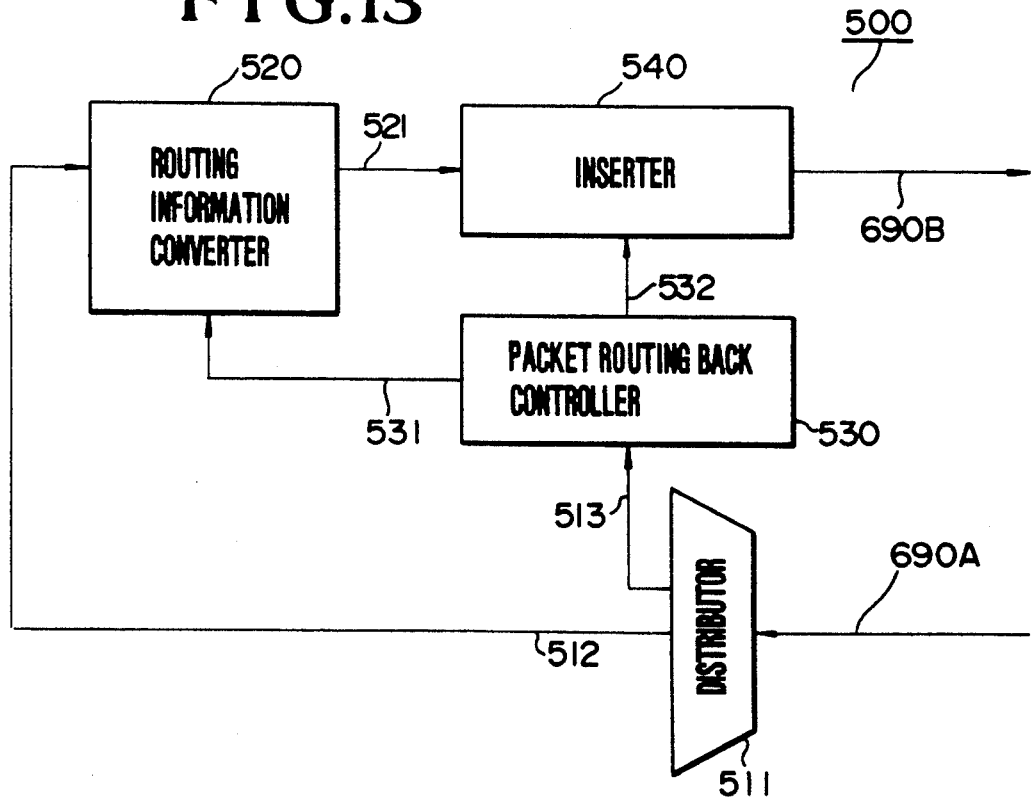
FIG. 13 shows a block diagram of a packet routing-back equipment 500 in the packet switch of FIG. 10.

Packet Routine-Back Unit 500:

A configuration of the packet routing-back unit 500 is shown in FIG. 13. The distributor 511 delivers only those of the input packets from the input line 690A which have VCI = "3" to the packet routing-back controller 530. Other packets (VCI = "0" or "1") are delivered to the routing information converter 520.

A configuration of the routing information converter 520 is shown in FIG. 14. The VCI separator 522 separates the input VCI 710 from the packet received from the distributor and supplies it to the switch routing-back routing information conversion table 525, and delivers the packet main field to the routing information addition circuit 526.

The routing information conversion table 525 stores the routing information 730' for each VCI 710 as shown in FIG. 15, and supplies the routing information addressed to the central processor 300 for the input VCI = "0" and the routing information addressed to the switch controller 240 of the first stage unit switch in which its own packet routing-back unit 500 is accommodated for the input VCI = "1", and delivers them to the routing information addition circuit 526.

The routing information addition circuit 526 adds the routing information 730' received from the routing information conversion table 525 to the packet main field supplied from the VCI separator 522 and delivers it to the inserter 540 through the signal line 521.

The packet routing-back controller 530 shown in FIG. 13 sets up the information into the routing information conversion table 525 in accordance with the control information included in the control packet supplied from the central processor 300. In order to send a response control packet to the control packet, the routing information table 533 which stores the output VCI 533-1 corresponding to the central processor 300 and the routing information 533-2 is provided, as shown in FIG. 16.

The inserter 540 effects the collision prevention control for the input packets from the routing information converter 520 and the packet routing-back controller 530, and supplies those packets to the output line 690B leading to the switch unit.

Operations:

The operation of the transmission of the control packet without the routing-back is identical to that of the Embodiment 1. The operation of the transmission of the control packet which requires the routing-back at the packet routing-back unit 500 is as follows.

(a) For example, when a control packet is to be sent from the central processor 300 to the switch controller 240-1, the central processor 300 sets up the output VCI 311-2 (=1) which designates the destination switch controller 240-1 retrieved from the routing information table 311 and the routing information 311-3 to the packet routing-back unit 500-1 accommodated in the unit switch 210-1 paired with the destination switch controller 240-1 into the VCI field 710 and the routing information field 730 of the control packet, respectively, and sends it to the output line 670B. The packet is switched from the unit switch 210-m to the third stage unit switch 230-1 through one of the second stage unit switch, and delivered to the packet routing-back unit 500-1 through the output line 690A-1.

In the packet routing-back unit 500-1, the distributor 151 recognizes that it is the control packet addressed to the switch controller based on the input VCI 710 of the packet and delivers the packet to the routing information converter 520.

The routing information converter 520 sets up (output VCI=input VCI) the routing information 730 (R1=line 640A-1) corresponding to the input VCI 710 into the received packet based on the routing information table 525, and routes it back to the output line 690B-1. Thus, the control packet is switched to the line 640A-1 by the unit switch 210-1 and delivered to the switch controller 240-1.

(b) For example, when a control packet is to be sent from the switch controller 260-1 to the central processor 300, the switch controller 260-1 sets up the output VCI 270-1 (=0) which designates the central processor retrieved the switch routing information table 270 and the routing information to the packet routing-back unit 500-1 accommodated in the unit switch 230-1 of the switch controller 260-1 into the VCI field 710 and the routing information field 730 of the control packet, respectively, and sends it to the output line 660B-1. The packet is switched to the output line 690A-1 by the unit switch 230-1 and delivered to the packet routing-back unit 500-1 through the output line.

In the packet routing-back unit 500-1, the distribution circuit 151 recognizes that it is the control packet addressed to the central processor based on the input VCI 710 of the received packet, and delivers the packet to the routing information converter 520.

The routing information converter 520 sets up (output VCI=input VCI) the routing information to the central processor 300 corresponding to the input VCI 710 into the routing information field 730 of the received packet, and routes it back to the output line 690B-1. The packet is switched from the unit switch 210-1 to the third stage unit switch 230-m through one of the second stage unit switches in accordance with the routing information, and delivered to the central processor 300 through the line 670A-m.

Operation for Expansion:

(1) Expansion of Line Interface 100:

The operation is identical to that of the Embodiment 1 except that it is not necessary to send the control packet to add the output VCI and the routing information for routing back the control packet, to the VCI conversion table 134 in the added line interface 100.

(2) Expansion of Switch Unit 200:

New output lines 6201-P to 630P-P are connected between the added unit switches and the existing unit switches, and input/output lines 690A-P and 690B-P are connected between the newly added packet routing-back unit 500-P and the added switch unit 200. The terminal 400 commands to the central processor 300 to add the output VCI 311-2 to the added equipments (the switch controller an the packet routing-back unit) and the routing information 311-3 to the central processor routing information table 311.

When the central processor completes the process for the command and is ready to send the control packet to the added equipments, the terminal 400 commands to the central processor 300 to send the control packet to add the routing information 730' for routing back the control packet to the routing information conversion table 525 in the routing information converter 520 of the added packet routing-back unit 500-P, the output VCI and the routing information to the central processor 300 to the routing information table in the packet routing-back controller 530, and the output VCI and the routing information to the central processor to the switch routing information table 270 in the added unit switch, respectively.

Embodiment 3

A third embodiment of the present invention which is a modification of the embodiment 1 is explained below.

Figure 17:
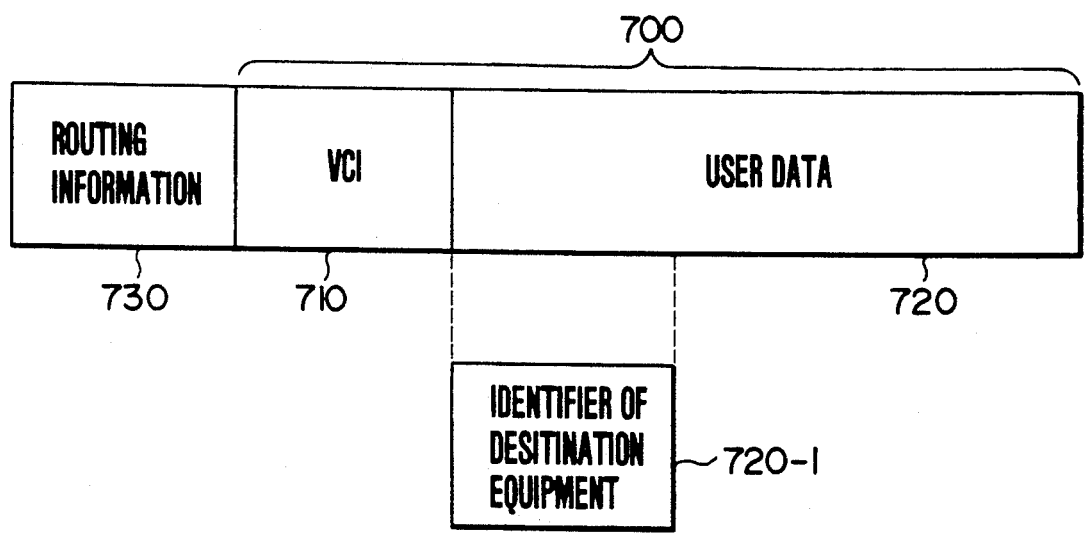
FIG. 17 shows another control packet format used in the present invention.

In the present embodiment, a control packet having a format shown in FIG. 17 is used in the packet switch configured as shown in FIG. 1. Namely, "0" is exclusively allocated to the VCI 710 of the control packet and the VCI's having values other than "0" are used for the packets communicated between the switches. A destination equipment identifier 720-1 is provided for the user data field (YD) 720 of the control packet to enable the line interface 100 to identify the destination equipment of the control packet. For example, the destination equipment identifier 720-1 is allocated such that "0" indicates the packet to the central processor, "1" indicates the packet to the switch controller and "2" indicates the packet to the line interface.

Central Processor 300:

Instead of the output VCI 311-2 of the routing information table of the central processor shown in FIG. 5, the value of the destination equipment identifier 720-1 is stored, and "0" is fixedly used for the output VCI field 710 of the control packet. The configuration of the central processor 300 per se is identical to that of the Embodiment 1 shown in FIG. 4.

Switch Unit 200:

Instead of the output VCI 270-1, the value of the destination equipment identifier 720-1 is set up in the routing information table 270 of each of the switch controllers 240 to 260, and "0" is fixedly used for the output VCI field 710 of the control packet. Others are identical to those of the Embodiment 1.

Line Interface 100:

The line interface 100 used in the present embodiment is configured as shown in FIG. 7 excluding the inserter 120 and the distribution circuit 153, namely, it is identical to the line interface 100' of the Embodiment 2 shown in FIG. 12.

The receiver 110 accommodates the input line 600A connected to the adjacent switch and delivers the received packet to the VCI converter 130.

The VCI converter 130 conducts the VCI conversion only for the packets communicated between the switches. Accordingly, in the VCI conversion table 134 shown in FIG. 9, any value other than "0" may be used for the output VCI. The VCI converter 130 delivers the input packet from the receiver to the inserter 122, which effects the collision prevention control for the input packets from the VCI converter 130 and the line interface controller 140 and supplies the packets to the output line 610B connected to the switch unit.

Figure 18:
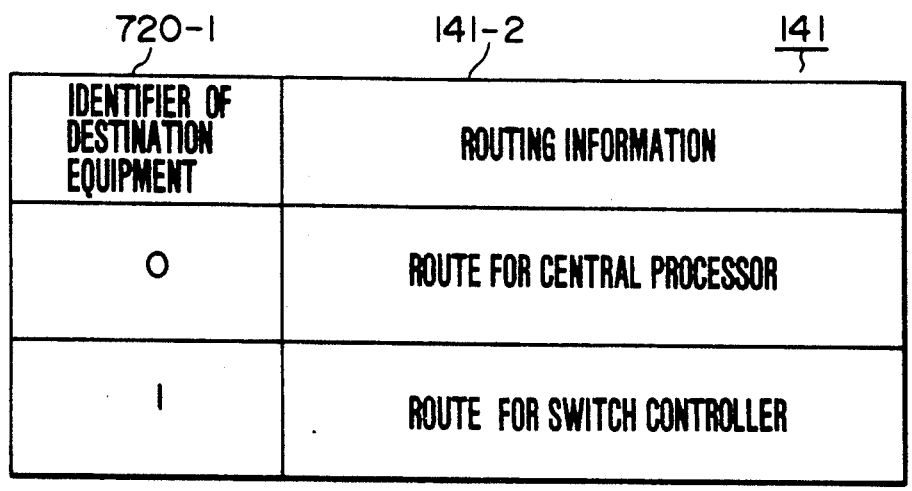
FIG. 18 shows a data structure of a routing information conversion table 141 of a line interface in a third embodiment of the present invention in which the packet format of FIG. 17 is applied to the packet switch of FIG. 1.

As shown in FIG. 18, the routing information 141-2 for the central processor or the switch controller is stored in the routing information table 141 looked up by the line interface 140, in accordance with the value of the destination equipment identifier 720-1.

Figure 19:
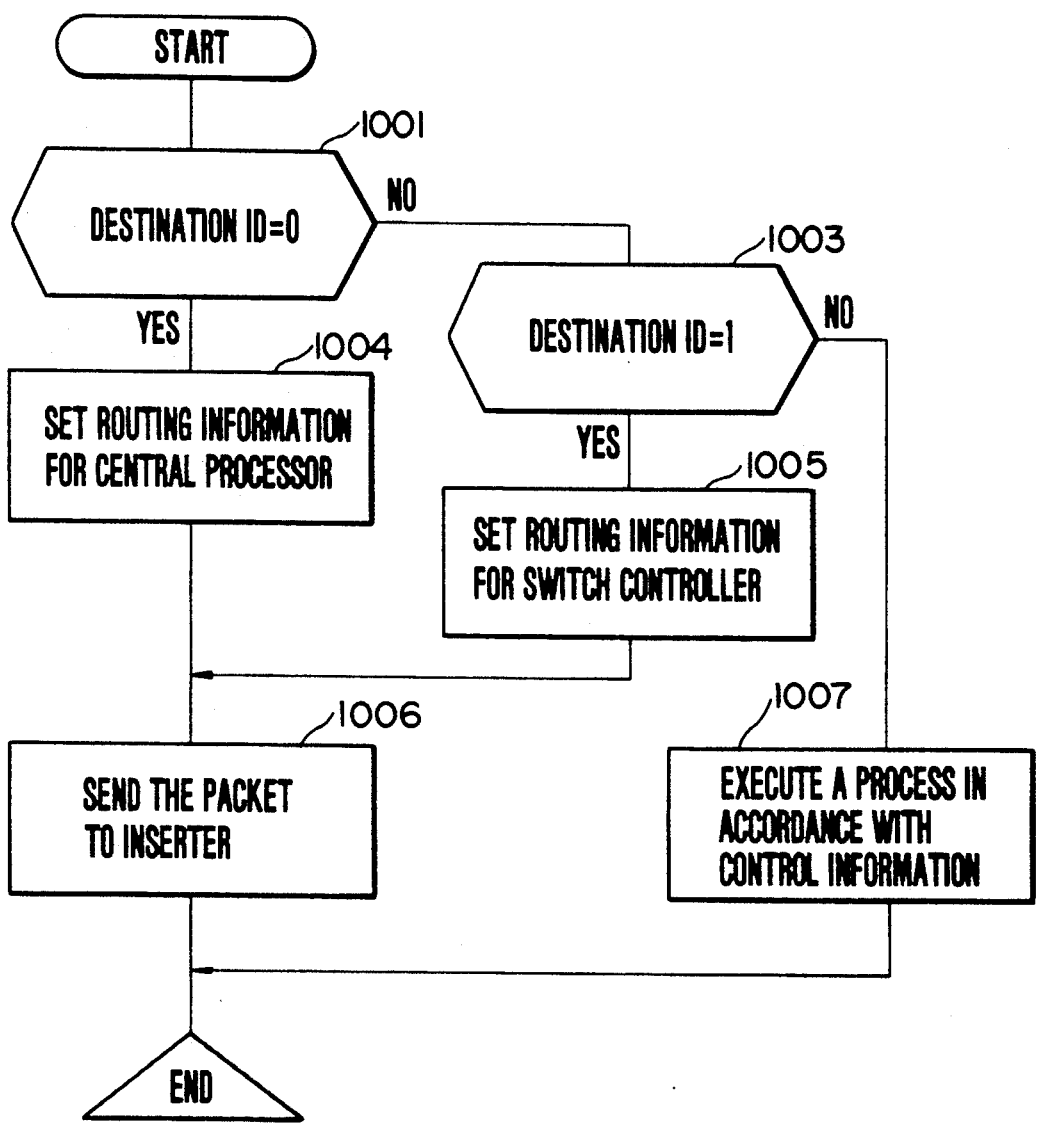
FIG. 19 shows a flow chart of an operation of the line interface when it receives a control packet in the third embodiment.

When the line interface controller 140 receives the control packet from the distribution circuit 151, it operates in accordance with a flow chart shown in FIG. 19.

First, it determines whether the destination equipment identifier 720-1 included in the received packet is "0" or not (step 1001). If the identifier is "0", it sets up the routing information for the central processor 300 into the routing information field 730 of the received packet in accordance with the routing information conversion table 141 in the line interface controller 140 (step 1004), and delivers the packet to the inserter 122 (step 1006). If the destination equipment identifier 720-1 is not "0", it determines if the identifier is "1" or not (step 1003). If it is "1", it sets up the routing information for the switch controller 240 defined in the routing information conversion table 141 into the routing information field 730 of the received packet (step 1005), and delivers the packet to the inserter 122 (step 1006). If the destination equipment identifier 720-1 is neither "0" nor "1" (the destination equipment identifier=2"), the information is set up to or released from the VCI conversion table 134 in accordance with the control information included in the user data field of the received packet (step 1007).

Where the line interface controller 140 autonomously sends the control packet to the central processor 300, the routing information for the central processor 300 defined in the routing information conversion table 141 is used (VCI="0", destination equipment identifier 720-1="0").

The distributor 151 delivers only those packets received from the switch unit through the input line 610A which have VCI="0", to the line interface controller 140, and delivers other packets to the transmitter 160.

Operations:

The transmission of the control packet which requires the routing-back, for example, the transmission of the control packet from the central processor 300 to the switch controller 240-1 is explained below.

The central processor 300 sets up the output VCI (=0) indicating that the transmitting packet is the control packet, the destination equipment identifier (=1) which indicates that the transmitting packet is to the switch controller 240-1, retrieved from the central processor routing information table 311, and the routing information for the line interface 100-1 accommodated in the unit switch 210-1 paired with the switch controller 240-1 into the fields 710, 720-1 and 730 of the transmitting packet, respectively, and sends it to the output line 670B. The packet is switched from the unit switch 210-m to the third stage unit switch 230-1 through one of the record stage unit switches, and delivered to the line interface 100-1 through the output line 610A-1.

In the line interface 100-1, he distribution 151 recognizes that it is the control packet based on the input VCI 710 of the received packet, and delivers the packet to the line interface controller 140. The line interface controller 140 sets up the routing information (R1=line 640A-1) retrieved from the routing information table 141 based or the destination equipment identifier 720-1 into the received packet, and routes it back to the output line 610B-1. The unit switch 210-1 switches the received packet from the output line 610B-1 to the line 640A-1 based on the routing information 730, and delivers it to the switch controller 240-1.

The operation for the expansion of the line interface 100 and the switch unit 200 in the packet switch 10 is now explained.

(1) Expansion of Line Interface 100-x:

Input/output lines 610A-x and 610B-x are connected between the added line interface 100-x and the switch unit which accommodates the line interface. The terminal 400 commands to the central processor 300 to add the destination equipment identifier 311-2' and the routing information 311-3 for the added equipment to the central processor routing information table 311. When the central processor 300 completes the operation for the command and is ready to send the control packet to the added equipment, the terminal 400 commands to the central processor 321 to send the control packet for adding the control packet routing-back routing information to the routing information conversion table 141 in the added line interface 100-x.

(2) Expansion of Switch Unit 200-P:

The operation is identical to that of the Embodiment 1 except that the destination equipment identifier 720-1 is used instead of the output VCI 1710.

Embodiment 4

A fourth embodiment of the present invention which is a modification of the Embodiment 2 is now explained. The present embodiment uses a control packet having the destination equipment identifier 720-1 in the user data field shown in FIG. 17 in the packet switch shown in FIG. 10. When the control packet is to be sent to the packet routing-back unit, the value "3" is set up in the destination equipment identifier 720-1.

Central Processor 300:

The value of the destination equipment identifier instead of the output VCI 311-2 is set up in the routing information table 311 of the central processor, and "0" is fixedly used for the output VCI field 710 of the control packet. Others are identical to those of the Embodiment 2.

Switch Unit 200:

Where it is necessary to route back the control packet sent from the switch controller 260 at the packet routing-back unit 500, the destination equipment identifier 720-1 and the routing information for the packet routing-back unit 500 which is to route back the packet is set up in the switch routing information table 270. Others are identical to those of the Embodiment 3.

Line Interface 100':

The distribution circuit 151 delivers only those received packets which have the input VCI="0" to the line interface controller 140. In the VCI conversion table 134, any VCI other than "0" may be used for the communication of the packet between the switches. Other configuration of the line interface is identical to that of the Embodiment 2.

Figure 20:
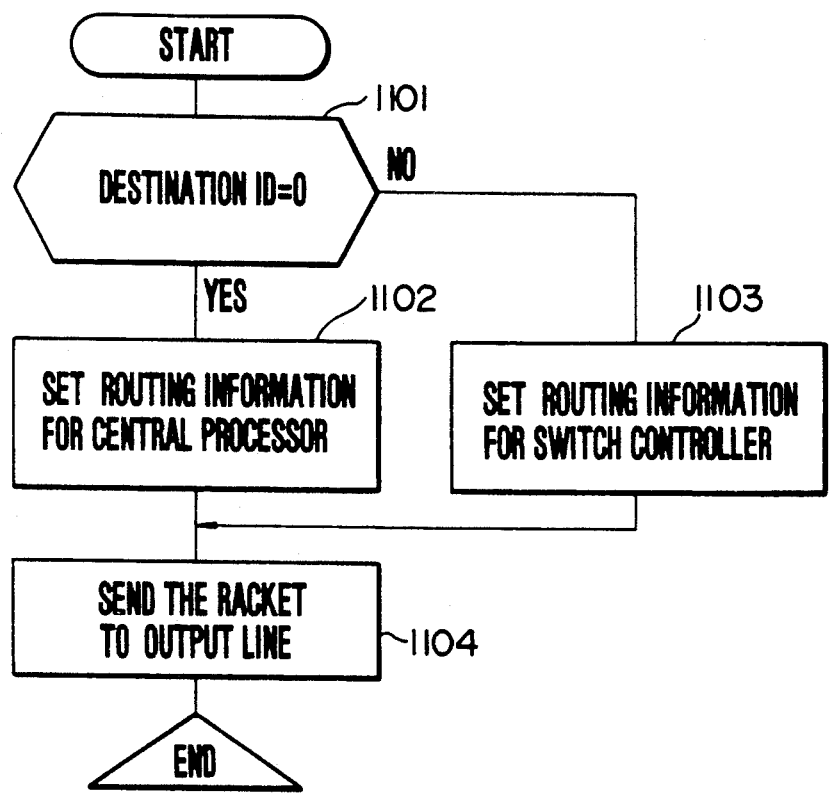
FIG. 20 shows a flow chart of an operation of the packet routing-back controller when it receives the control packet in a fourth embodiment of the present invention in which the packet format of FIG. 7 is applied to the packet switch of FIG. 10.

Packet Routing-Back Unit 500:

In the present embodiment, the packet routing-back controller 530 shown in FIG. 13 receives all input packets from the input line 690A, updates the routing information in accordance with a flow chart shown in FIG. 20, and sends the packets having the routing information thereof updated to the output line 690B.

Accordingly, the packet routing-back unit 500 may be configured as shown in FIG. 13 excluding the distribution circuit 151, the route information converter 520 and the inserter 540.

The packet routing-back controller 530 is provided with the routing information conversion table which stores similar routing information to that of the table 141 shown in FIG. 18 for each value of the destination equipment identifier 720-1.

When the packet routing-back controller 530 receives a packet from the input line 690A, it determines whether the destination equipment identifier 720-1 included in the packet is "0" or not (step 1101). If the value of the identifier is "0", it sets up the routing information for the central processor 300 defined in the routing information conversion table into the routing information field 730 of the packet (step 1102), and supplies the packet to the output line 690B leading to the switch unit 200 (step 1104). If the destination equipment identifier included in the received packet is not "0" (the destination equipment identifier="1"), the routing information for the switch controller 240 defined in the routing information conversion table is set up in the packet (step 1103) and the packet is supplied to the output line 690B.

When the packet routing-back controller 530 autonomously sends the control packet for the central processor 300, the routing information for the central processor 300 defined in the routing information conversion table is added to the packet and the packet is sent (VCI="0", destination equipment identifier 720-1="0").

Operations:

The transmission of the control packet which requires the routing-back at the packet routing-back unit, for example, the transmission from the central processor 300 to the switch controller 240-1 is first explained.

The central processor 300 sets up the output VCI ="0" which indicates the control packet, the destination equipment identifier (="1") which indicates that the packet is to the switch controller, retrieved from the central processor routing information table 311, and the routing information for the packet routing-back unit 500-1 accommodated in the unit switch 210-1 paired with the destination equipment controller 240-1 into the control packet, and sends it to the output line 670B. The packet is switched from the unit switch 210-m to the third stage unit switch 230-1 through one of the second stage unit switches, and supplied to the packet routing-back unit 500-1 from the output line 690A-1.

In the packet routing-back unit 500-1, the controller 530 sets up the routing information (R1=line 640A-1) corresponding to the destination equipment identifier 720-1 of the received packet into the received packet and routes it back to the output line 690B-1. Thus, the packet is supplied to the line 640A-1 by the unit switch 210-1 and supplied to the destination switch controller 240-1.

The operation for the expansion is now described.

(1) Expansion of Line Interface 100:

It is identical to that of the Embodiment 2.

(2) Expansion of Switch Unit 200:

Output lines 6201-P to 630P-P are connected between the added unit switch and the existing unit switches. Input/output lines 690A-P and 690B-P are connected between the added packet routing-back unit 500-P and the switch units 210-P and 230-P. The terminal 400 commands to the central processor 300 to add the destination equipment identifier and the routing information for the added equipments (the switch controller and the switch routing-back unit) to the central processor routing information table 311. When the central processor 300 completes the processor for the command and is ready to send the control packet the added equipment, the terminal 400 commands to the central processor 300 to send the control packet for adding the routing information 730 for the control packet to the routing information conversion table of the added packet routing-back unit, and destination equipment identifier and the route information for the central processor to the switch routing information table 270 in the added unit switch.

Embodiment 5:

A fifth embodiment of the present invention which is a modification of the Embodiment 1 is now explained.

Figure 21:
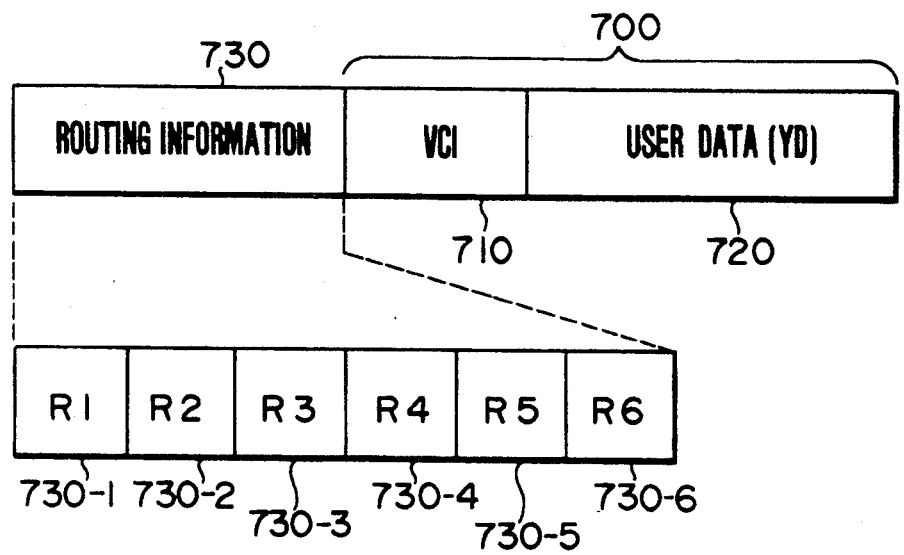
FIG. 21 shows other control packet format used in the present invention.

Packet Format:

The present embodiment uses a control packet having a format shown in FIG. 21. The routing information field 730 comprises R1 (730-1) to R6 (730-6). The fields R1 (730-1) to R3 (730-3) are identical to those of the Embodiment 1. The field R4 (730-4) designates the output line from the first stage unit switch 210-i through which the routed-back packet passes to the second stage unit switch 220-j or the switch controller 240-i, the field R5 (730-5) designates the output line from the second stage unit switch 220-j after the routing-back to the third stage unit switch 230-k or the switch controller 250-j, and the field R6 (730-6) designates the output line from the third stage unit switch 230-k after the routing-back to the line interface 100-L or the switch controller 260-k.

Central Processor 300:

As shown in FIG. 22, the routing information for the fields R4 to R6 is added to the central processor routing information table 311. Others are identical to those of the Embodiment 1.

For example, when it is required to route back the transmitted control packet at the line interface 100-i, a code which designates the output line 610A-i to the line interface 100-i is set up in the field 730-3 which indicates the field R3 of the packet.

Switch Unit 200:

Each of the switch controllers 240, 250 and 260 sets up the output VCI 270-1 ("0" is fixedly used) for the central processor 300, and the routing information 270-2 including the fields R1 to R6 (which includes the routing information after the routing-back when the routing-back at the line interface 100 is required), in the switch routing information table 270. Others are identical to those of the Embodiment 1.

Figure 23:
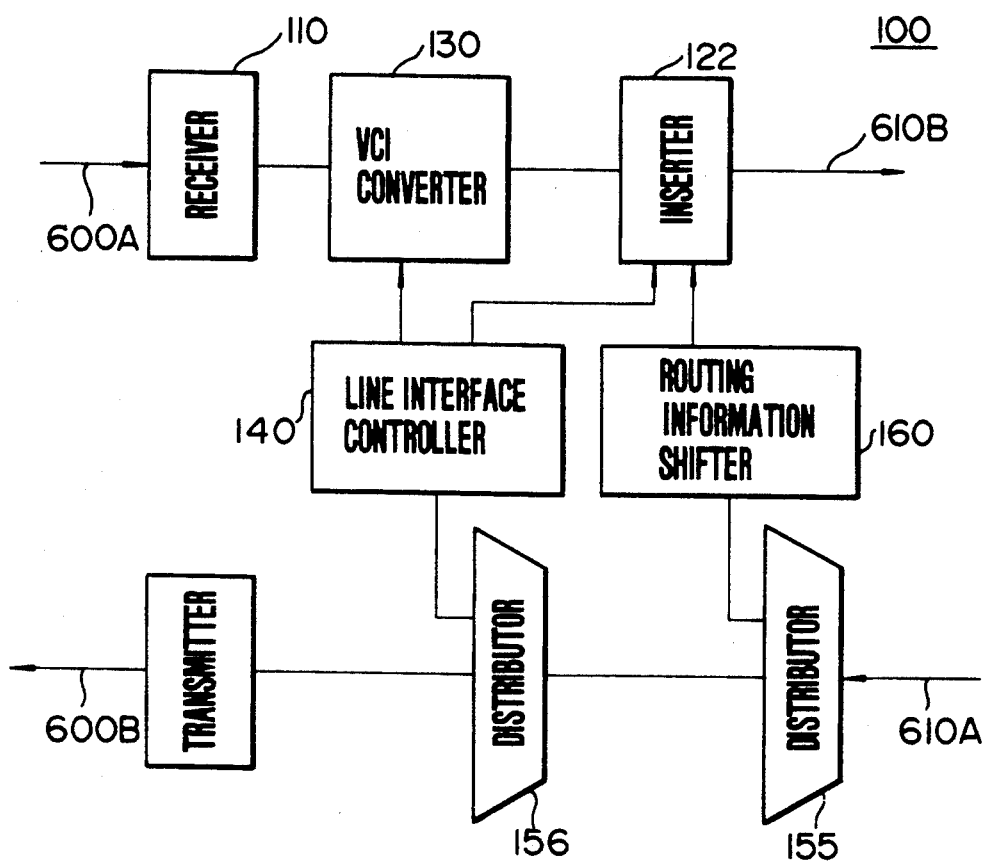
FIG. 23 shows a block diagram of a line interface 100 in the fifth embodiment.

Line Interface 100:

A configuration of the line interface 100 is shown in FIG. 23.

The receiver 110 accommodates the input line 600A from the adjacent switch, and delivers the received packet to the VCI converter 130.

The VCI converter 130 is identical to that of the Embodiment 1 except that the values "0" to "2" are not used for the input VCI 710A' of the VCI conversion table 134.

The inserter 122 effects the collision prevention control for the input packets from the VCI converter 130, the line interface controller 140 and the routing information shifter 160, and delivers the packets to the output line 610B leading to the switch unit.

The line interface controller 140 is identical to that of the Embodiment 1.

The routing information shifter 160 shifts the routing information R4 to R6 of the control packet received from the distributor 155 to the positions R1 to R3, and delivers the packet to the inserter 122.

The distributor 155 delivers only those packets supplied from the input line 610A which have "0" or "1" as the input VCI 710 to the routing information shifter 160. The distribution 156 delivers only those input packets which have "2" as the input VCI 710 to the line interface controller 140 and delivers other packets to the transmitter 160.

Operations:

The transmission of the control packet which requires the routing-back, for example, the transmission from the central processor 300 to the switch controller 240-1 is now explained.

The central processor 300 sets up the output VCI 311-2 (="1") which indicates the destination switch controller, retrieved from the central processor routing information table 311 and the routing information 311-3 (including the routing information R4 to R5 after the routing-back at the line interface 100-1) for the destination switch controller 240-1, into the packet, and sends it to the output line 670B. The packet is switched from the unit switch 210-m to the unit switch 230-1 in accordance with the routing information R1 to R3, and delivered to the line interface 100-1 through the output line 610A-1.

In the line interface 100-1, the distribution circuit 155 shown in FIG. 23 recognizes that the input packet is the control packet to the switch controller based on the input VCI 710 of the received packet, and delivers it to the routing information shifter 160.

The routing information shifter 160 shifts the routing information R4 to R6 included in the packet to the positions R1 to R3 and supplies the packet to the inserter 122. Thus, the packet is routed back to the output line 610B and supplied to the unit switch 210-1.

The unit switch 210-1 switches the packet to the line 640A-1 in accordance with the routing information R4 of the received packet. Thus, the control packet reaches the switch controller 240-1 which is the destination equipment.

The operation for the expansion is now described.

(1) Expansion of Line Interface 100:

The operator connects the input/output lines between the added line interface 100 and the switch unit which accommodates the line interface, and the terminal 400 commands to the central processor 300 to add the output VCI and the routing information for the added equipment to the central processor routing information table 311. When the central processor completes the operation for the command and is ready to send the control packet to the added equipment, the terminal 400 commands to the central processor 300 to send the control package for adding the output VCI and the routing information for sending the control packet to the central processor, to the routing information table 141 in the added line interface 100.

(2) Expansion of Switch Unit 200:

Output lines 6201-P to 630P-P are connected between the added unit switches 210P to 230P and the existing unit switches, and the terminal 400 commands to the central processor 321 to add the output VCI and the routing information for the added equipments (the switch controllers 240-P to 260-P) to the central processor routing information table 311. When the central processor completes the process for the command and is ready to send the control package to the added equipment, the terminal 400 commands to the central processor 321 to send the control package for adding the output VCI and the routing information for sending the control packet to the central processor, to the routing information table 270 in the added unit switch.

Embodiment 6

In the present embodiment, the control packet having the format shown in FIG. 21 is used for the packet switch of the Embodiment 2 shown in FIG. 10. An overall configuration is identical to that of the Embodiment 2 except that the packet routing-back unit 500 does not require the set-up function of the routing information into the control packet.

Central Processor 300:

Where it is required to route back the control packet at the packet routing-back unit 500-i, the output line 690A-i to the packet routing-back unit 500-i is designated by the R3 field of the routing information. Others are identical to those of the Embodiment 5.

Switch Unit 200:

The output VCI ("0" is fixedly used) and the routing information for the central processor 300 are stored in the routing information table 270 of each of the switch controllers 240, 250 and 260. Where it is required to route back the control packet at the packet routing-back unit 500, the routing information R4 to R5 after the routing-back is pre-defined. Others are identical to those of the Embodiment 2.

Line Interface 100':

The line interface may be identical to that of the Embodiment 2.

Figure 24:
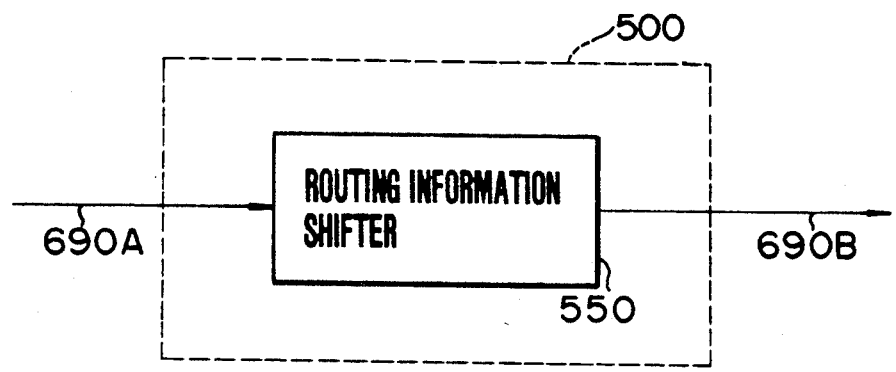
FIG. 24 shows a block diagram of a packet routing-back equipment 500 in a sixth embodiment of the present invention in which the packet format of FIG. 21 is applied to the packet switch of FIG. 10.

Packet Routing-Back Unit 500:

The packet routing-back unit 500 is provided with the routing information shifter 550 as shown in FIG. 24. The routing information shifter 550 shifts the fields R4 to R6 of the routing information 730 included in the control packet received from the input line 690A to the positions R1 to R3 as it does in FIG. 23, and routes back the packet to the switch unit 200 through the signal line 690B.

Operations:

The transmission of the control packet which requires the routing-back, for example, the transmission from the central processor 300 to the switch controller 240-1 is now explained.

The central processor 300 retrieves the output VCI 311-2 (="1") corresponding to the destination switch controller 240-1 and the routing information 311-3 (including the routing information R4 to R6 after the routing-back at the packet routing-back unit 500-1) from the routing information table 311, sets up them into the control packet, and sends it to the output line 670B. The control packet is switched from the unit switch 210-m to the unit switch 230-1 in accordance with the routing information R1 to R3, and supplied to the packet routing-back unit 500-1 through the output line 690A-1. The control packet is routed back to the output line 690B-1 after the routing information R4 to R6 has been shifted to the positions R1 to R3 by the routing information shifter 550 of the packet routing-back unit 500-1. Accordingly, the unit switch 210-1 receives the control packet, switches it to the line 640A-1 in accordance with the routing information R4 and delivers it to the destination switch controller 240-1.

The operation for the expansion is described below.

(1) Expansion of Line Interface 100:

It is identical to that of the Embodiment 2.

(2) Expansion of Switch Unit 200:

Output lines are connected between the added unit switches 210-P, 220-P and 230-P and the existing unit switches, and the input/output lines 690A-P and 690B-P are connected between the added packet routing-back unit 500-P and the added switches.

The terminal 400 commands to the central processor 300 to add the output VCI and the routing information for the added equipments (the switch controllers 240-P, 250-P and 260-P) to the central processor routing information table 311. When the central processor completes the process for the command and is ready to send the control packet to the added equipments, the terminal 400 commands to the central processor 300 to send the control packet for adding the output VCI and the routing information for sending the control packet to the central processor, to the routing information table 270 in each of the added switch controllers.

As seen from the above embodiments, the packet switch of the present invention communicates the control information between the control equipment and the speech path equipment of the switch via the control packet through the packet switch, no separate signal line for the control information is needed between the elements of the control equipment and the speech path equipment, and the wiring in the switch is facilitated.

What is claimed is:

1. A packet switching system comprising:
    switch means having a plurality of input lines and a plurality of output lines for switching a packet supplied from any one of the input lines to one of the output lines selected in accordance with routing information put to the packet;
    a plurality of line interface means each connected to one of the input lines and one of the output lines of said switch means;
    a plurality of pairs of lines each including an outer input line and an outer output line, each pair of lines being connected to one of said line interface means, for communicating user packets between said switch means and a terminal device or other switching system connected to said pair of lines; and
    central processing means connected to one of the input lines and one of the output lines of said switch means;
    said central processing means having means for generating internal control packets to be delivered to said line interface means or said switch means to control the switching of user packets and means for outputting said internal control packets to said one input line of the switch means, each of said internal control packet including routing information for specifying a route toward destination of the internal control packet and internal control information to be informed to said line interface means or said switch means, each of said internal control packets being delivered to its said line interface means or said switch means through said switch means.

2. A packet switching system according to claim 1:
    said switch means includes a plurality of unit switches each having a plurality of input lines, a plurality of output lines, and means for transferring a packet received from one of said input lines thereof to one of said output lines thereof selected on the basis of routing information of the received packet, and a plurality of switch control means provided for each unit switch, said unit switches being arranged in rows and columns, the input lines of unit switches in the first column forming the input lines of said switch means, the output lines of unit switches in the final column forming the output lines of said unit switch means, said unit switches being connected so as to transfer internal control packets and user packets received by any one of the unit switches in the first column to any one of the unit switches in the final column; and
    each of said switch control means transmits and receives internal control packets to and from said central processing means through the unit switch connected to said switch control means.

3. A packet switching system according to claim 2 wherein
    said line interface means includes means for routing-back an internal control packet supplied from the output line of said switch means to the input lines of said switch means;
    whereby an internal control packet addressed to a particular switch control means supplied from said central processing means or an internal control packet transmitted from a particular control means switch to said central processing means is delivered to its destination through said line interface means.

4. A packet switching system according to claim 3 wherein
    each of said line interface means includes means for updating the routing information of the internal control packet transmitted from one of said switch control means and addressed to the central processing unit or one of the other switch control means, the updated internal control packet being routed back to said switch means by said routing-back means and delivered to its destination by receiving switching operation based on the updated routing information.

5. A packet switching system according to claim 4 wherein said central processing unit, each of said line interface means and each of said switch control means includes means for generating internal control packets with the routing information defined in the sequence of passage of the internal control packet through the unit switch;

each of said unit switches selects the output line to which the received packet is to be sent in accordance with the routing information of a particular order corresponding to the unit switch.

6. A packet switch comprising:

switch means having a plurality of input lines and a plurality of output lines for sending a packet supplied from each of the input lines to one of the output lines selected in accordance with identification information put to each packet;

a plurality of pairs of lines, each pair of lines having an input line and an output line connected to terminals or other switch means;

a plurality of line interface means one for each pair of lines, each interface means being connected to one of the input lines and one of the output lines of said switch means; and central processing means connected to one of the input lines and one of the output lines of said switch means;

whereby control information is communicated between said central processing means and the line interface means or the switch means via a control packet through the input lines or the output lines of said switch means;

said unit switch means includes a plurality of multi-stage connected switches, each having a plurality of input lines and a plurality of output lines, and unit switch control means provided for each unit switch;

said input lines of succeeding unit switches being connected to output lines of preceding unit switches and input lines of a first unit switch being said input lines of said switch means and output lines of a final unit switch being said output lines of said switch means;

each of said switch control means transmits and receives the control packet to and from said central processing means through the unit switch connected to said switch control means;

said line interface means includes means for routing back the control packet supplied from the output line of said switch means to the input lines of said switch means;

the control packet addressed to a particular switch control means supplied from said central processing means or the control packet sent from a particular switch control means to said central processing means is delivered to a destination means through said line interface means;

wherein each source of the control packet includes means for adding to the control packet to be sent a logical channel number predetermined by the type of the destination equipment means of the control packet and routing information for the control packet;

each of said unit switches selects an output line to which the received packet is sent in accordance with the route information put on the received packet; and each of said line interface means includes means for updating the routing information of the control packet received from one of said switch control means and addressed to the central processing unit or another switch control means.

7. A packet switch comprising:

switch means having a plurality of input lines and a plurality of output lines for sending a packet supplied from each of the input lines to one of the output lines selected in accordance with identification information put to each packet;

a plurality of pairs of lines, each pair of lines having an input line and an output line connected to terminals or other switch means;

a plurality of line interface means one for each pair of lines, each interface means being connected to one of the input lines and one of the output lines of said switch means; and central processing means connected to one of the input lines and one of the output lines of said switch means;

whereby control information is communicated between said central processing means and the line interface means or the switch means via a control packet through the input lines or the output lines of said switch means;

said switch means includes a plurality of multi-stage connected unit switches, each having a plurality of input lines and a plurality of output lines, and switch control means provided for each unit switch;

said input lines of succeeding unit switches being connected to output lines of preceding unit switches and input lines of a first unit switch being said input lines of said switch means and output lines of a final unit switch being said output lines of said switch means;

each of said switch control means transmits and receives the control packet to and from said central processing means through the unit switch connected to said switch control means;

said line interface means includes means for routing back the control packet supplied from the output line of said switch means to the input line of said switch means;

the control packet addressed to a particular switch control means supplied from said central processing means or the control packet sent from a particular switch control means to said central processing means is delivered to a destination means through said line interface means;

said central processing unit, each of said line interface means and said switch control means include means for sending the control packet with the routing information defined as the sequence of passage of the control packet through the unit switches, added thereto;

each of said unit switches selects the output line to which the received packet is to be sent in accordance with the routing information of a particular order corresponding to the unit switch; and each of said line interface means includes means for routing back the control packet to said switch means after having updated the order of the routing information includes in the control packet received from said switch means and addressed to said central processing means or one of said switch control means.

8. A packet switch comprising:

switch means having a plurality of input lines and a plurality of output lines for sending a packet supplied from each of the input lines to one of the output lines selected in accordance with identification information put to each packet;

a plurality of pairs of lines, each pair of lines having an input line and an output line connected to terminals or other switch means;

a plurality of line interface means one for each pair of lines, each interface means being connected to one of the input lines and one of the output lines of said switch means; and central processing means connected to one of the input lines and one of the output lines of said switch means;

whereby control information is communicated between said central processing means and the line interface means or the switch means via a control packet through the input lines or the output lines of said switch means;

said switch means includes a plurality of multi-stage connected unit switches, each having a plurality of input lines and a plurality of output liens, and switch control means provided for each unit switch;

said input lines of succeeding unit switches being connected to output lines of preceding unit switches and input lines of a first unit switch being said input lines of said switch means and output lines of a final unit switch being said output lines of said switch means input;

each of said switch control means transmits and receives the control packet to and from said central processing means through the unit switch connected to said switch control means;

said unit switches of said switch means are divided into a plurality of switch groups;

each of said switch groups includes packet routing-back means connected to an input line of one of first stage unit switches and an output line of one of final stage switches;

said central processing means is connected to an input line of the first stage switches of a particular one switch group and output line of one of the final stage unit switches of the particular switch group; and particular one of the control packets sent from said central processing means or said switch control means is delivered to the destination means through one of the packet routing-back means.

9. A packet switch comprising:

switch means having a plurality of input lines and a plurality of output lines for sending a packet supplied from each of the input lines to one of the output lines selected in accordance with identification information put to each packet;

a plurality of pairs of lines, each pair of lines having a input line and an output line connected to terminals or other switch means;

a plurality of line interface means one for each pair of lines, each interface means being connected to one of the input lines and one of the output lines of said switch means;

central processing means connected to one of the input lines and one of the output lines of said switch means;

whereby control information is communicated between said central processing means and the line interface means or the switch means via a control packet through the input lines or the output lines of said switch means;

said switch means includes a plurality of multi-stage connected unit switches, each having a plurality of input lines and a plurality of output lines, switch control means provided for each unit switch;

said input lines of succeeding unit switches being connected to output lines of preceding unit switches and input lines of a first unit switch being said input lines of said switch means and output lines of a final unit switch being said output lines of said switch means;

each of said switch control means transmits and receives the control packet to and from said central processing means through the unit switch connected to said switch control means;

said unit switches of said switch means are divided into a plurality of switch groups;

each of said switch groups includes packet routing-back means connected to an input line of one of first stage unit switches and an output line of one of final stage unit switches;

said central processing means is connected to an input line of the first stage unit switches of a particular one switch group and an output line of one of the final stage unit switches of the particular switch group;

a particular one of the control packets sent from said central processing means or said switch control means is delivered to the destination means through one of the packet routing-back means;

said central processing means, said line interface means and said switch control means include means for sending the control packet in the format having the logical channel number predetermined by the type of destination equipment means of the control packet and the routing information for the control packet;

each of said unit switches selects the output line to which the received packet is to be sent in accordance with the routing information included in the received packet; and said packet routing-back means updates the routing information of a received packet and routes back the received packet having the updated routing information to the switch means when the received packet is addressed to the central processing means or one of the switch control means.

10. A packet switch comprising:

switch means having a plurality of input lines and a plurality of output lines for sending a packet supplied from each of the input lines to one of the output lines selected in accordance with identification information put to each packet;

a plurality of pairs of lines, each pair of lines having an input line and an output line connected to terminals or other switch means;

a plurality of line interface means one for each pair of lines, each interface means being connected to one of the input lines and one of the output lines of switch means;

central processing means connected to one of the input lines and one of the output lines of said switch means;

whereby control information is communicated between said central processing means and the line interface means or the switch means via a control packet through the input lines or the output lines of said switch means;

said switch means includes a plurality of multi-stage connected unit switches, each having a plurality of input lines and a plurality of output lines, and switch control means provided for each unit switch;

said input lines of succeeding unit switches being connected to output lines of preceding unit switches and input lines of a first unit switch being said input lines of said switch means and output lines of a final unit switch being said output lines of said switch means;

each of said switch control means transmits and receives the control packet to and from said central processing means through the unit switch connected to said switch control means;

said central processing means, said line interface means and said switch control means includes means for adding the routing information in the order of passage of the control packet through the unit switches to the control packet to be sent;

each of said unit switches selects the output line to which the received packet is to be sent in accordance with the routing information of a particular order corresponding to its own unit switch, includes in the received packet; and each of said packet routing-back means updates the order of the routing information of a received control packet and routes back the received control packet to said switch means when said received control packet is addressed to said central processing means or one of said switch control means.

11. A packet switching system comprising:

switch means having a plurality of input lines and a plurality of output lines for sending a packet supplied from any one of the input lines to one of the output lines selected in accordance with routing information put to each packet;

a plurality of line interface means each connected to one of the input lines an done of the output lines of said switch means;

a plurality of pairs of lines, each pair of lines having an outer input line and outer output line, each pair of lines being connected to one of said line interface means, for communicating user packet between said switch means and a terminal device or other switching system connected to the pair of lines;

central processing means, connected to one of the input lines and one of the output lines of said switch means, including means for generating internal control packets to be delivered to said line interface means or said switch means; and a plurality of packet routing-back means each connected with one of input lines of said switch means and one of output lines of said switch means;

said switch means comprising a plurality of unit switches divided into a plurality of switch groups and a plurality of switch control means provided for each switch;

each of said unit switches having a plurality of input lines, a plurality of output lines, and means of transferring a packet received from one of said input lines thereof to one of output line thereof selected on the basis of routing information of the received packet;

each of said switch groups including at least two unit switches arranged in multi-stage, the input lines of a first stage unit switches forming the input lines of said switch means, the output lines of a final stage unit switches forming the output lines of said switch means, said unit switches being connected so as to transfer internal control packets and user packets received by any one of the first stage unit switches to any one of the final stage unit switches;

each of said packet routing-back means being provided for each switch group and connected to one of input lines of the first stage unit switch and one of output lines of the final stage unit switch in each switch group; and wherein a particular one of the internal control packets sent out from said central processing means or said switch control means is delivered to its destination through one of the packet routing back means.

12. A packet switch according to claim 11 wherein said central processing means, said line interface means and said switch control means includes means for sending internal control packets in the format having the logical channel number predetermined by the type of destination of the internal control packet and routing information for specifying a route toward the destination of the internal control packet;

each of said unit switches selects the output line to which the received packet is to be sent in accordance with the routing information includes in the received packet; and said packet routing-back means includes means for updating the routing information of a received packet and routes back the received packet having updated routing information to the switch means when the received packet is addressed to the central processing means or one of the switch control means.

13. A packet switch according to claim 11 wherein said central processing means, said line interface means and said switch control means includes means of reading the routing information in the order of passage of the internal control packet through the unit switches to the internal control packet to be sent;

each of said unit switches selects the output line to which the received packet is to be sent out in accordance with the routing information of a particular order corresponding to its own unit switch, includes in the received packet; and each of said packet routing-back means includes means for updating the order of the routing information of the received internal control packet and routes back the packet to said switch means when said received packet is addressed to said central processing means or one of said switch control means.

* * * * *